US012458442B2

(12) United States Patent
Rock et al.

(10) Patent No.: US 12,458,442 B2
(45) Date of Patent: Nov. 4, 2025

(54) APPARATUS, SYSTEM, AND METHOD FOR BONE LOSS COMPENSATION OF A PATIENT'S KNEE JOINT DURING AN ORTHOPAEDIC SURGICAL PROCEDURE

(71) Applicant: DePuy Ireland Unlimited Company, Ringaskiddy (IE)

(72) Inventors: Michael J. Rock, Leeds (GB); Robert Freeman, Leeds (GB); Martin Preutenborbeck, Leeds (GB)

(73) Assignee: DePuy Ireland Unlimited Company, Ringaskiddy (IE)

( * ) Notice: Subject to any disclaimer, the term of this patent is extended or adjusted under 35 U.S.C. 154(b) by 217 days.

(21) Appl. No.: 18/217,224

(22) Filed: Jun. 30, 2023

(65) Prior Publication Data
US 2025/0000582 A1 Jan. 2, 2025

(51) Int. Cl.
*A61B 34/10* (2016.01)
*A61B 17/56* (2006.01)
(Continued)

(52) U.S. Cl.
CPC .............. *A61B 34/10* (2016.02); *A61F 2/461* (2013.01); *A61B 2017/564* (2013.01);
(Continued)

(58) Field of Classification Search
CPC ........ A61B 2017/564; A61B 2034/104; A61B 2034/105; A61B 2034/107;
(Continued)

(56) References Cited

U.S. PATENT DOCUMENTS 7,842,092 B2   11/2010   Otto et al.
8,172,775 B2    5/2012   Warkentine et al.
(Continued)

FOREIGN PATENT DOCUMENTS

EP       2861140 A1    4/2015
JP    2007523696 A    8/2007
(Continued)

OTHER PUBLICATIONS

Clouthier, et al; The Effect of Articular Geometry Features IDentified Using Statistical Shape Modelling on Knee Biomechanics; Medical Engineering and Physics 66 (2019) 47-55.
(Continued)

*Primary Examiner* — Samuel S Hanna
(74) *Attorney, Agent, or Firm* — Barnes & Thornburg LLP

(57) ABSTRACT

An apparatus, system, and method for compensating for bone loss of a patient's knee joint during the performance of an orthopaedic surgical procedure includes determining an estimated amount of bone loss of a bone of a patient's knee joint, determining an anatomical distance between a femoral anatomical feature of a patient's femur and a tibial anatomical feature of a patient's tibia, and adjusting the determined anatomical distance based on the estimated amount of bone loss. The determined anatomical distance is indicative of a ligament length of a collateral ligament of the patient's knee joint. The bone loss may be estimated based on, for example, a surface curve fitting algorithm applied to a three-dimensional model of the bone, a defined bone loss amount provided by a user, or a comparison of the three-dimensional model of the bone to a statistical shape model that approximates the bone in a healthy state.

12 Claims, 16 Drawing Sheets

(51) Int. Cl.
*A61F 2/46* (2006.01)
*A61B 34/20* (2016.01)

(52) U.S. Cl.
CPC ... *A61B 2034/104* (2016.02); *A61B 2034/105* (2016.02); *A61B 2034/107* (2016.02); *A61B 2034/2068* (2016.02); *A61F 2002/4633* (2013.01)

(58) Field of Classification Search
CPC .... A61B 2034/2055; A61B 2034/2068; A61B 2090/3983; A61B 34/10; A61B 34/20
See application file for complete search history.

(56) References Cited

U.S. PATENT DOCUMENTS

| | | | |
|---|---|---|---|
| 8,983,813 | B2 | 3/2015 | Miles et al. |
| 9,248,001 | B2 | 2/2016 | Colombet et al. |
| 10,064,686 | B2 | 9/2018 | McKinnon et al. |
| 2005/0251148 | A1 | 11/2005 | Friedrich et al. |
| 2006/0161051 | A1 | 7/2006 | Terrill-Grisoni et al. |
| 2006/0241405 | A1 | 10/2006 | Leitner et al. |
| 2007/0179626 | A1 | 8/2007 | De La Barrera et al. |
| 2008/0208081 | A1 | 8/2008 | Murphy et al. |
| 2008/0281329 | A1 | 11/2008 | Fitz et al. |
| 2010/0010506 | A1 | 1/2010 | Murphy |
| 2010/0152741 | A1 | 6/2010 | Park et al. |
| 2015/0148653 | A1 | 5/2015 | Fleig et al. |
| 2016/0228193 | A1 | 8/2016 | Moctezuma De La Barrera et al. |
| 2018/0140232 | A1 | 5/2018 | Fleig et al. |
| 2020/0383729 | A1 | 12/2020 | Amanatullah |
| 2022/0008219 | A1 | 1/2022 | Logan |
| 2023/0005232 | A1* | 1/2023 | Harris, Jr. ............. G06T 7/0014 |

FOREIGN PATENT DOCUMENTS

| | | |
|---|---|---|
| WO | 2005072629 A1 | 8/2005 |
| WO | 2006078236 A1 | 7/2006 |
| WO | 2013185811 A1 | 12/2013 |

OTHER PUBLICATIONS

Depuy Synthes; VELYS Robotic-Assisted Solution for Total Knee, User Guide—Software v1.6; IFU-0902-60-0222 Rev. L.

Chao, et al; Virtual Interactive Musculoskeletal System (VIMS) in Orthopaedic Research, Education and Clinical Patient Care; Journal of Orthopaedic Surgery and Research; Mar. 8, 2007; 19 pages.

Van Der Esch, et al; Knee Varus—Valgus Motion During Gait—A Measure of Joint Stability in Patients with Osteoarthritis; Osteoarthritis and Cartilage (2008) 16, 522-525.

Heesterbeek, et al; Posterior Cruciate Ligament Recruitment Affects Antero-Posterior Translation During Flexion Gap Distraction in Total Knee Replacement; Acta Orthopaedica 2010; 81 (4): 471-477.

Tranberg, et al.; Simultaneous Measurements of Knee Motion Using an Optical Tracking System and Radiostereometric Analysis (RSA); Acta Orthopaedica 2011; 82 (2): 171-176.

Amiri, et al; A Computational Modeling Approach for Investigating Soft Tissue Balancing in Bicruciate Retaining Knee Arthroplasty; Hindawi Publishing Corporation Computational and Mathematical Methods in Medicine vol. 2012, Article ID 652865, 11 pages.

International Search Report and Written Opinion in PCT/EP2024/068007, mailed Oct. 2, 2024, 22 pages.

Fucentese, Sandro F., et al, "A novel augmented reality-based surgical guidance system for total knee arthroplasty", Archives of Orthopaedic and Trauma Surgery, Springer Verlag, DE, vol. 141, No. 12, Oct. 26, 2021, 7 pages.

\* cited by examiner

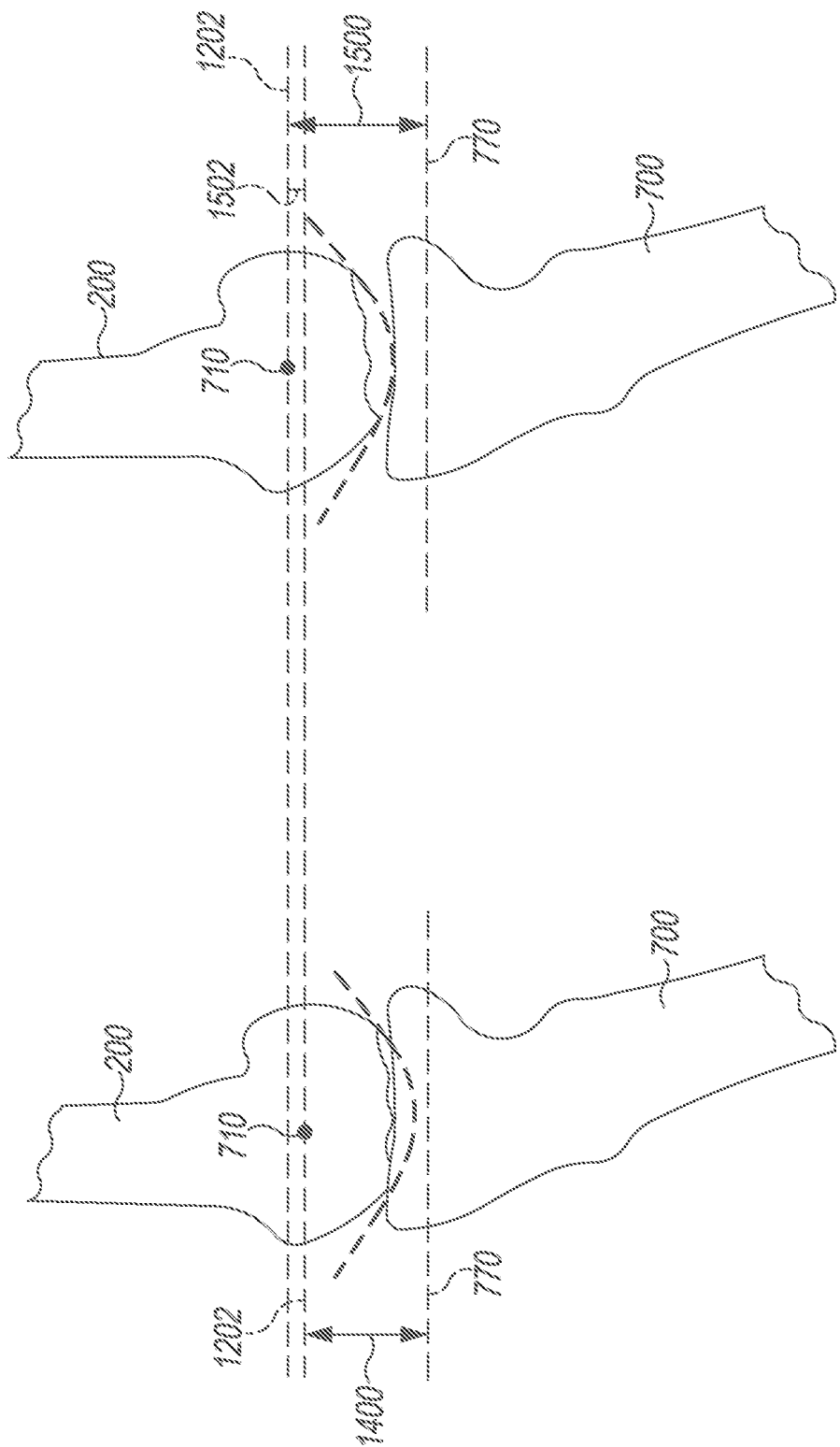

APPARATUS, SYSTEM, AND METHOD FOR BONE LOSS COMPENSATION OF A PATIENT'S KNEE JOINT DURING AN ORTHOPAEDIC SURGICAL PROCEDURE

TECHNICAL FIELD

The present disclosure relates generally to computer-assisted surgery systems for use in the performance of orthopaedic surgical procedures, and more particularly to technologies for compensating for bone loss of a patient's boney anatomy during a knee orthopaedic surgical procedure.

BACKGROUND

Joint arthroplasty is a well-known surgical procedure by which a diseased and/or damaged natural joint is replaced by a prosthetic joint, which may include one or more orthopaedic implants. For example, in a knee arthroplasty surgical procedure, a patient's natural knee joint is partially or totally replaced by a prosthetic knee joint. A typical prosthetic knee joint includes a tibial tray, a femoral component, and a polymer insert or bearing positioned between the tibial tray and the femoral component.

To facilitate the replacement of the natural joint with a prosthetic joint, orthopaedic surgeons may use a variety of orthopaedic surgical instruments such as, for example, surgical saws, cutting guides, reamers, broaches, drill guides, drills, positioners, insertion tools and/or other surgical instruments. For example, a surgeon may prepare a patient's tibia to receive the tibial tray by resecting the proximal tibia with a surgical saw, and the surgeon may prepare the patient's femur to receive the femoral component by performing multiple resections of the distal femur with an appropriate orthopaedic surgical instrument, such as a surgical saw, burr, or the like. A surgeon may use manual instruments such as cutting blocks or other cutting guides to perform various resections in an orthopaedic procedure. Alternatively, or in addition, a surgeon may use a computer-assisted surgical navigation system, such as a robotic-assisted surgical system, to perform the various resections in the orthopaedic procedure.

Typically, an orthopaedic surgeon may perform some amount of pre-operative and/or intra-operative planning to, for example, determine a positioning of the knee prosthesis. In situations in which the patient's boney anatomy has suffered significant bone loss (e.g., due to disease or trauma), the determination of the positioning of the prosthesis can be complicated due to the bone loss.

SUMMARY

According to an aspect of the present disclosure, a method for compensating for bone loss of a patient's knee joint during the performance of an orthopaedic surgical procedure may include determining, by a computer system, an estimated amount of bone loss of a bone of a patient's knee joint based on a three-dimensional model of the bone; determining, by the computer system, an anatomical distance between a femoral anatomical feature located on the patient's femur and a tibial anatomical feature located on the patient's tibia at a plurality of degrees of flexion of the patient's knee joint while the femur of the patient's knee joint is in contact with the tibia of the patient's knee joint; and adjusting, by the computer system, the determined anatomical distance at each degree of flexion based on the estimated amount of bone loss of the bone of the patient's knee joint. The bone may include the femur and/or the tibia of the patient's knee joint, and the anatomical distance may be indicative of a ligament length of a collateral ligament of the patient's knee joint.

In some embodiments, determining the estimated amount of bone loss of the bone of the patient's knee joint may include applying, by the computer system, a surface curve fitting algorithm to the three-dimensional model of the bone; and determining, by the computer system, the estimated amount of bone loss based on a difference between a damaged surface of the bone of the patient's knee joint as indicated in the three-dimensional model and a corresponding surface defined by the surface curve fitting algorithm. Additionally or alternatively, determining the estimated amount of bone loss of the bone of the patient's knee joint may include receiving, by the computer system, a defined bone loss amount provided by a user of the computer system; and determining, by the computer system, the estimated amount of bone loss based on the defined bone loss amount. In such embodiments, receiving the defined bone loss amount may include receiving, by the computer system, a defined bone loss amount for a plurality of locations of a damaged surface of the bone of the patient's knee joint from the user of the computer system and each location of the plurality of locations of the damaged surface may contact the other one of the femur or the tibia of the patient's knee joint at a corresponding degree of flexion of the patient's knee.

Additionally, in some embodiments, determining the estimated amount of bone loss of the bone of the patient's knee joint may include updating the three-dimensional model of the bone of the patient's knee joint to include indicia of a damaged surface of the bone, obtaining a three-dimensional statistical shape model of a reference bone corresponding to the bone of the patient's knee joint, and adjusting a set of parameters of the three-dimensional statistical shape model to approximate the bone of the patient's knee joint in a healthy state that does not include the damaged surface; and comparing the three-dimensional model of the bone of the patient's knee joint including the indicia of the damaged surface to the three-dimensional statistical shape model to determine the estimated amount of bone loss of the bone of the patient's knee joint. In such embodiments, the reference bone is indicative of a "healthy" bone and does not include the damaged surface.

In some embodiments, determining the anatomical distance between the femoral anatomical feature and the tibial anatomical feature may include determining an anatomical distance between an attachment point of the collateral ligament on the patient's femur and an attachment point of the collateral ligament on the patient's tibia. In such embodiments, determining the anatomical distance between the attachment point of the collateral ligament on the patient's femur and the attachment point of the collateral ligament on the patient's tibia may include determining an anatomical distance that is indicative of a length of a medial collateral ligament or a lateral collateral ligament of the patient's knee joint while the patient's knee joint is moved through a range of flexion with the femur of the patient's knee joint in contact with the tibia of the patient's knee joint.

Additionally or alternatively, in some embodiments, determining the anatomical distance between the tibial anatomical feature and the femoral anatomical feature may include determining an anatomical distance between an attachment point of the collateral ligament on the patient's femur and a planned cutting plane of the patient's tibia in each degree of flexion of the plurality of degrees of flexion of the patient's knee. In such embodiments, adjusting the determined anatomical distance of the collateral ligament may include, for example, increasing the determined anatomical distance between the attachment point of the collateral ligament on the patient's femur and the planned cutting plane of the patient's tibia at each degree of flexion of the plurality of degrees of flexion of the patient's knee.

In some embodiments, adjusting the determined anatomical distance may include adjusting an estimated length of a medial collateral ligament or a lateral collateral ligament of the patient's knee joint at each degree of flexion based on the estimated amount of bone loss of the bone of the patient's knee joint.

Additionally, in some embodiments, the method may further include determining, by the computer system, a cutting plane of the bone of the patient's knee joint based on the adjusted determined anatomical distance and performing an orthopaedic bone resection on the bone of the patient's knee joint using the determined cutting plane as a reference for the orthopaedic bone resection. In some embodiments, adjusting the determined anatomical distance may include adjusting the determined anatomical distance by an adjustment amount that is based on the estimated amount of bone loss of the bone of the patient's knee joint. In some embodiments, the method may further include determining, by the computer system, an initial cutting plane of the bone of the patient's knee joint. In such embodiments, determining the cutting plane of the bone of the patient's knee joint based on the adjusted determined anatomical distance may include moving the initial cutting plane by the adjustment amount to define a final cutting plane. Additionally, in such embodiments, performing the orthopaedic bone resection may include performing the orthopaedic bone resection on the bone of the patient's knee joint using the final cutting plane as a reference for the orthopaedic bone resection.

Additionally, in some embodiments, the method may further include identifying, by the computer system, the femoral anatomical feature and the tibial anatomical feature based on a location of a navigation pointer. The method may also include identifying, by the computer system, an attachment point of the collateral ligament on the femur and on the tibia of the patient's joint based on indicia, supplied by a user of the computer system, located on the three-dimensional model of the bone of the patient's knee joint.

According to another aspect of the present disclosure, an orthopedic surgical planning system for compensating for bone loss of a patient's knee joint during the performance of an orthopaedic surgical procedure may include at least one processor and at least one memory device. The at least one memory device may have stored therein a plurality of instructions that, when executed by the at least one processor, cause the orthopedic surgical planning system to determine an estimated amount of bone loss of a bone of a patient's knee joint based on a three-dimensional model of the bone, determine an anatomical distance between a femoral anatomical feature located on the patient's femur and a tibial anatomical feature located on the patient's tibia at a plurality of degrees of flexion of the patient's knee joint while the femur of the patient's knee joint is in contact with the tibia of the patient's knee joint, and adjust the determined anatomical distance at each degree of flexion based on the estimated amount of bone loss of the bone of the patient's knee joint. The bone may include the femur and/or the tibia of the patient's knee joint, and the anatomical distance may be indicative of a ligament length of a collateral ligament of the patient's knee joint.

In some embodiments, to determine the estimated amount of bone loss of the bone of the patient's knee joint may include to apply a surface curve fitting algorithm to the three-dimensional model of bone and to determine the estimated amount of bone loss based on a difference between a damaged surface of the bone of the patient's knee joint as indicated in the three-dimensional model and a corresponding surface defined by the surface curve fitting algorithm. Additionally or alternatively, to determine the estimated amount of bone loss of the bone of the patient's knee joint may include to receive a defined bone loss amount provided by a user of the computer system and to determine the estimated amount of bone loss based on the defined bone loss amount. Furthermore, in some embodiments, to determine the estimated amount of bone loss of the bone of the patient's knee joint may include update the three-dimensional model of the bone of the patient's knee joint to include indicia of a damaged surface of the bone, obtain a three-dimensional statistical shape model of a reference bone corresponding to the bone of the patient's knee joint, adjust a set of parameters of the three-dimensional statistical shape model to approximate the bone of the patient's knee joint in a healthy state that does not include the damaged surface; and compare the three-dimensional model of the bone of the patient's knee joint including the indicia of the damaged surface to the three-dimensional statistical shape model to determine the estimated amount of bone loss of the bone of the patient's knee joint. In such embodiments, the reference bone is indicative of a "healthy" bone and does not include the damaged surface.

Additionally, in some embodiments, to determine the anatomical distance between the femoral anatomical feature and the tibial anatomical feature may include to determine an anatomical distance between an attachment point of the collateral ligament on the patient's femur and an attachment point of the collateral ligament on the patient's tibia. Additionally or alternatively, in some embodiments, to determine the anatomical distance between the tibial anatomical feature and the femoral anatomical feature may include to determine an anatomical distance between an attachment point of the collateral ligament on the patient's femur and a planned cutting plane of the patient's tibia in each degree of flexion of the plurality of degrees of flexion of the patient's knee.

In some embodiments, to adjust the determined anatomical distance may include to adjust the determined anatomical distance by an adjustment amount that is based on the estimated amount of bone loss of the bone of the patient's knee joint. In such embodiments, the plurality of instructions, when executed by the at least one processor, further cause the orthopedic surgical planning system to determine an initial cutting plane of the bone of the patient's knee joint and adjust the initial cutting plane by the adjustment amount to define a final cutting plane. An orthopaedic surgeon may subsequently perform a bone resection using the final cutting plane as a reference.

According to a further aspect of the present disclosure, a method for compensating for bone loss of a patient's knee joint during the performance of an orthopaedic surgical procedure may include determining, by a computer system, an estimated amount of bone loss of a femur a patient's knee joint based on a three-dimensional model of the femur; determining, by the computer system, an estimated length of a collateral ligament of the patient's knee joint by determining an anatomical distance between an attachment point of the collateral ligament on the femur of the patient's knee joint and a planned cutting plane of a tibia of the patient's knee joint; and increasing, by the computer system, the determined length of the collateral ligament at each degree of flexion based on the estimated amount of bone loss of the bone of the patient's knee joint and the degree of flexion.

In some embodiments, increasing the determined anatomical distance may include increasing the determined anatomical distance by an adjustment amount that is based on the estimated amount of bone loss of the femur of the patient's knee joint. In such embodiments, the method may further include determining an initial cutting plane of the femur of the patient's knee joint, adjusting the initial cutting plane by the adjustment amount to define a final cutting plane, and performing an orthopaedic bone resection on the femur of the patient's knee joint using the final cutting plane as a reference for the orthopaedic bone resection.

Additionally, in some embodiments, determining the estimated amount of bone loss of the femur of the patient' knee joint may include determining the estimated amount of bone loss based on a surface curve fitting algorithm applied to the three-dimensional model, a defined bone loss amount provided by a user of the computer system, or a comparison of the three-dimensional model of the bone of the patient's knee joint that has been updated to include indicia of a damaged surface of the bone and a three-dimensional statistical shape model of a reference bone that approximates the bone of the patient's knee joint in a healthy state that does not include the damaged surface.

BRIEF DESCRIPTION OF THE DRAWINGS

The detailed description particularly refers to the following figures, in which:

FIG. 14 is a three-dimensional model of the patient's knee joint including the damaged femur of the FIG. 2 positioned in extension with the damaged portion of the patient's femur in contact with the patient's tibia;

FIG. 15 is a three-dimensional model of a patient's knee joint including the damaged femur of the FIG. 2 positioned in extension with the position of the patient's femur adjusted based on an estimated amount of bone loss, which increases the anatomical distance between the determined anatomical features of the patient's femur and tibia as indicated.

DETAILED DESCRIPTION OF THE DRAWINGS

Figure 1:
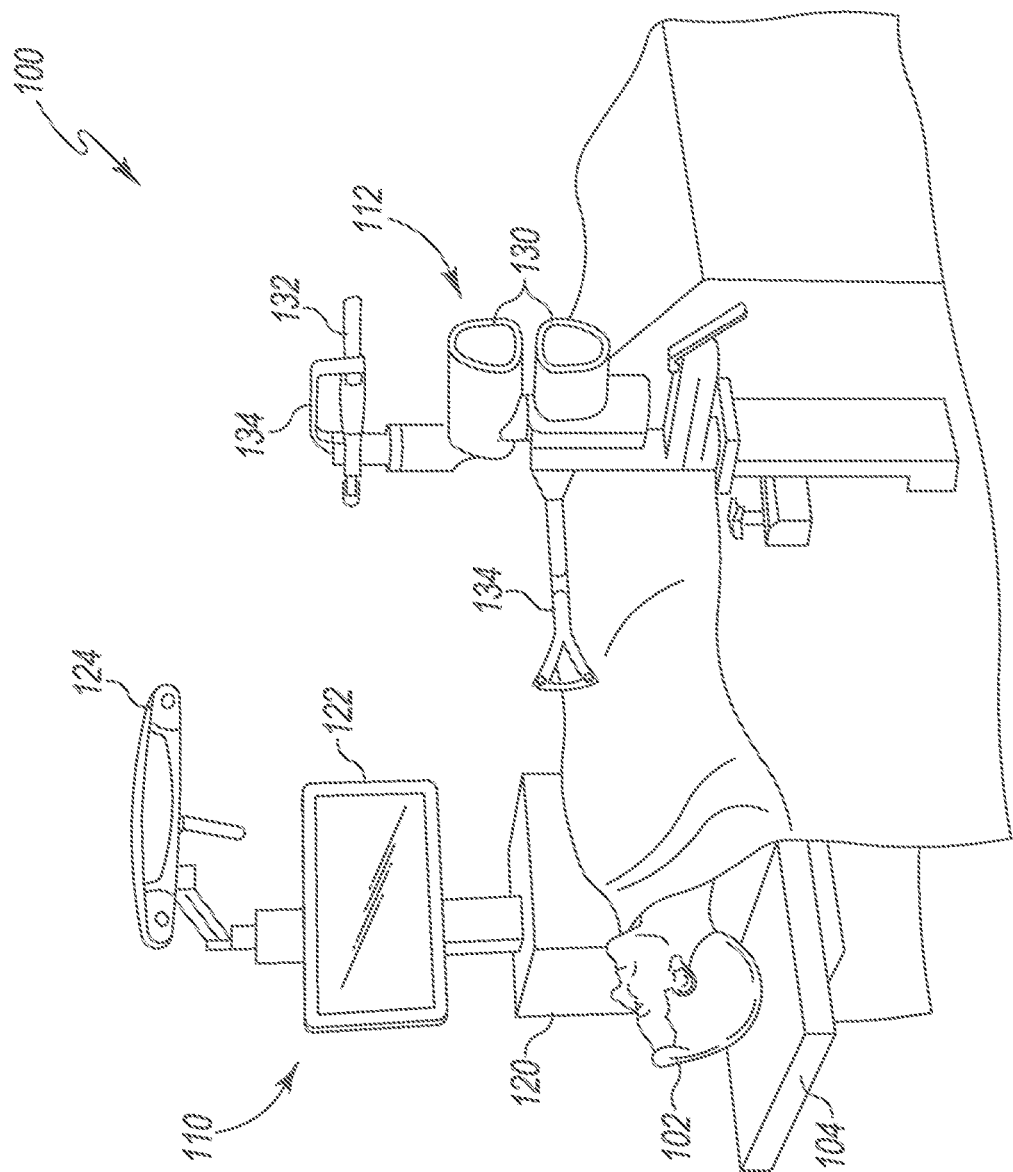
FIG. 1 is a schematic diagram of at least one embodiment of a system for planning and assisting an orthopedic surgical procedure.

While the concepts of the present disclosure are susceptible to various modifications and alternative forms, specific illustrative embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Terms representing anatomical references, such as anterior, posterior, medial, lateral, superior, inferior, etcetera, may be used throughout the specification in reference to the orthopaedic implants and surgical instruments described herein as well as in reference to the patient's natural anatomy. Such terms have well-understood meanings in both the study of anatomy and the field of orthopaedics. Use of such anatomical reference terms in the written description and claims is intended to be consistent with their well-understood meanings unless noted otherwise.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative surgical computer system 100 is configured to assist an orthopaedic surgeon in the planning and performance of an orthopaedic surgical procedure (e.g., a total knee arthroplasty (TKA) procedure) on a knee joint of a patient 102. The surgical computer system 100 includes a base station 110 and a robotic-assisted surgical device 112, which may be selectively coupled to a surgical table 104. The base station 110 includes a surgical planning and assistance computer system 120, an associated display 122, and a tracking system 124. The robotic-assisted surgical device 112 includes an automated positioning system 130, which may include a number of motors or other positioning devices, a surgical tool 132 (e.g., a bone saw) controlled by the automated positioning system 130, and one or more navigation markers 134. Each navigation marker 134 may be attached to the automated positioning system 130 itself and/or the surgical tool 132 (or an attachment for the surgical tool 132) as shown in FIG. 1. The navigation markers 134 are tracked by the tracking system 124 to determine a position of the robotic-assisted surgical device 112 (via the navigation marker 134 attached to the device 112) and a position of the surgical tool 132 (via the navigation marker 134 attached to the surgical tool 132) relative to the patient's boney anatomy as discussed in more detail below.

In some embodiments, the surgical computer system 100 may also include one or more mobile satellite stations (not shown), which are communicatively coupled to the base station 110 to provide a duplicated display and input device for the orthopaedic surgeon to use within the surgical operation envelope. For example, the satellite station may include a surgical barrier (e.g., a plastic wrapper) to allow the satellite station to be used in the vicinity of the patient 102 during the performance of the orthopaedic surgical procedure. Additionally, in some embodiments, the satellite station may be used to couple and decouple the robotic-assisted surgical device 112 with the surgical table 104.

In use, the surgical computer system 100 may be used by an orthopaedic surgeon to pre-operatively and/or intra-operatively plan and modify the orthopaedic surgical procedure. For example, in the case of a total knee arthroplasty procedure, the orthopaedic surgeon may operate the surgical computer system 100 to plan and/or modify the various cutting planes of the patient's femur and tibia. The orthopaedic surgeon may subsequently utilize the robotic-assisted surgical device 112 to perform the planned/modified cutting planes and other steps of the orthopaedic surgical plan. In use, the robotic-assisted surgical device 112 controls and limits the orthopaedic surgeon's positioning of the surgical tool 132 to the planned cutting planes, which can improve the accuracy and speed of the corresponding bone cuts. As discussed above, the location of the surgical tool 132 relative to the patient's boney anatomy is tracked by the tracking system 124 based on the location of the navigation marker 134 attached to the surgical tool 132 (or to which the surgical tool 132 is attached), which can be visualized by the orthopaedic surgeon on the display 122 along with a digital image (e.g., a three-dimensional model) of the patient's relevant boney anatomy.

Figure 2:
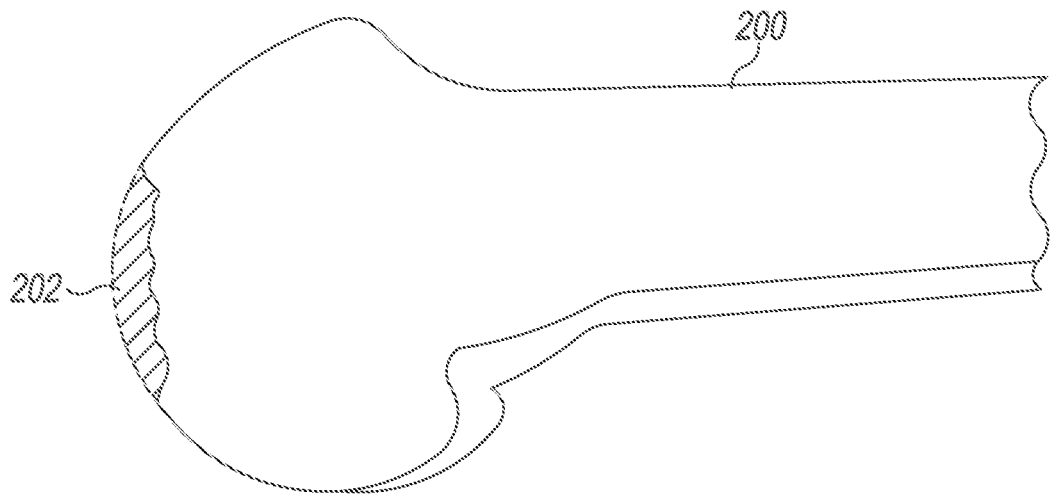
FIG. 2 is a side elevation view of a damaged femur of a patient's knee joint.
Figure 3:
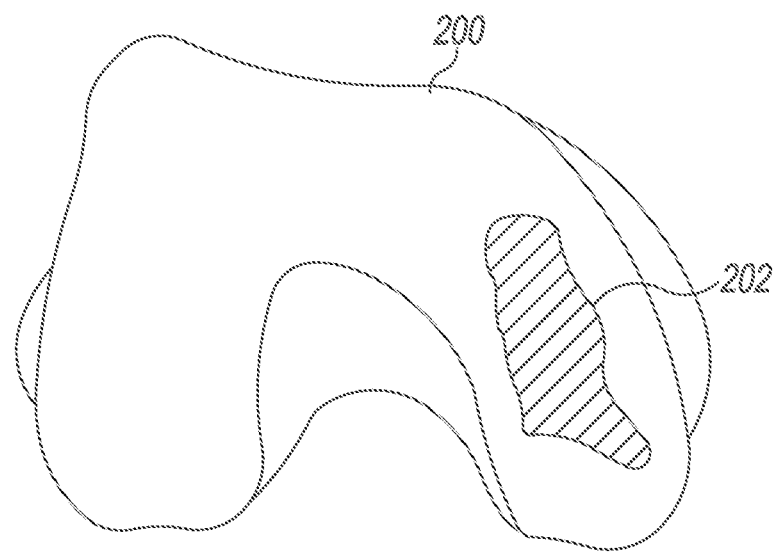
FIG. 3 is an elevation view of a distal end of the damaged femur of FIG. 2

As discussed in more detail below, the surgical computer system 100 is also configured to support the planning and performance of orthopaedic surgical procedures on patients' knee joints in various stages of health. To this end, in situations in which the patient's femur and/or tibia are damaged (e.g., via trauma or due to disease), the surgical computer system 100 is configured to compensate for the bone loss of the patient's femur and/or tibia in the orthopaedic surgical plan. For example, as shown in FIGS. 2 and 3, a patient's damaged femur 200 may include a damaged or diseased area 202 in which the femur 200 has lost some amount of bone material (illustrated in FIGS. 2 and 3 as a hashed region). If the damaged area 202 lies on the distal end of the patient's femur 200 as shown in FIG. 2, the damaged area 202 can increase the laxity of the medial and lateral collateral ligaments of the corresponding knee joint through a range of flexion because the femur 200 will articulate at a lower position on the patient's tibia. As such, in orthopaedic surgical plans endeavoring to recreate or approximate the collateral ligament tension of the patient's healthy knee joint (i.e., prior to the damage of the patient's knee joint), the bone loss of the femur and/or tibia may be considered in determining the appropriate cutting planes of the patient's knee joint to arrive at a desired ligament length, which may be an approximation or otherwise indicative of the ligament tension.

To do so, the surgical computer system 100 is configured to generate (e.g., intraoperatively) or otherwise acquire a three-dimensional model (e.g., based on a three-dimensional medial image or a set of two-dimensional medical images) of the patient's relevant knee joint to which the patient's actual knee is subsequently registered. For example, the orthopaedic surgeon may attach navigation markers to each of the patient's femur and tibia such that the patient's knee joint can be tracked in three-dimensional space by the tracking system 124. The patient's knee joint may then be registered to the three dimensional model by identifying anatomical landmarks on the patient's femur and/or tibia, which are correlated to landmarks on the three-dimensional model.

Additionally, the surgical computer system 100 identifies anatomical features on the patient's femur and tibia, each femoral-tibial pair of which defines an anatomical distance therebetween. As discussed in more detail below, the anatomical distance between the identified femoral and tibial anatomical features is indicative of, or otherwise provides a representation of, the ligament length of the patient's knee joint, which may itself be indicative of an amount of ligament tension of the patient's knee joint. For example, in some embodiments, the anatomical features may be embodied as the femoral and tibial attachment points of the medial and lateral collateral ligaments and, in such embodiments, the anatomical distance (i.e., the distance between the femoral and tibial attachment points of the collateral ligaments) is indicative of the patient's collateral ligament tension. In other embodiments, other anatomical features may be used such as the femoral attachment point of the collateral ligaments and a location on the patient's tibia corresponding to a planned tibial resection plane (or other femoral and/or tibial locations).

The surgical computer system 100 also estimates the amount of bone loss of the relevant patient's bone (e.g., the femur). To do so, as discussed in more detail below, the bone loss may be estimated based on a surface curve fitting algorithm, on a defined bone loss amount provided by the orthopaedic surgeon, on a comparison of the three-dimensional model of the patient's damaged bone and a three-dimensional shape model that approximates the of the patient's "healthy" bone (e.g., prior to damage), or on some other methodology. Regardless, the estimated bone loss amount corresponds to a distance between the patient's damaged boney surface (e.g., the damaged area 202) and an approximated surface of the patient's healthy bone (i.e., prior to the trauma or disease).

The orthopaedic surgeon may subsequently articulate the patient's knee joint through a range of flexion, ensuring the patient's femur 200 is in contact with the patient's tibia through the range of flexion. The surgical computer system 100 tracks the relative positioning of the patient's femur 200 and tibia based on the navigation makers attached thereto and determines an anatomical length or distance (i.e., a distance between the identified anatomical features, such as the attachment points of the collateral ligaments) that is indicative of the length of the associated medial and lateral collateral ligaments through the range of flexion. The surgical computer system 100 subsequently adjusts the determined anatomical distance based on the estimated amount of bone loss and the particular degree of flexion and updates the orthopaedic surgical plan based on the adjusted anatomical distance (e.g., by moving or adjusting related cutting planes). That is, the surgical plan may be updated automatically by the surgical computer system 100 (e.g., by modifying the cutting planes, selecting different orthopaedic prostheses, modifying the implantation position of the orthopaedic prostheses, etc.) or manually by the orthopaedic surgeon such that the relative position of the patient's femur and tibia is maintained post-implantation. The orthopaedic surgeon may then operate the surgical computer system 100 to perform the updated orthopaedic surgical procedure.

Figure 4:
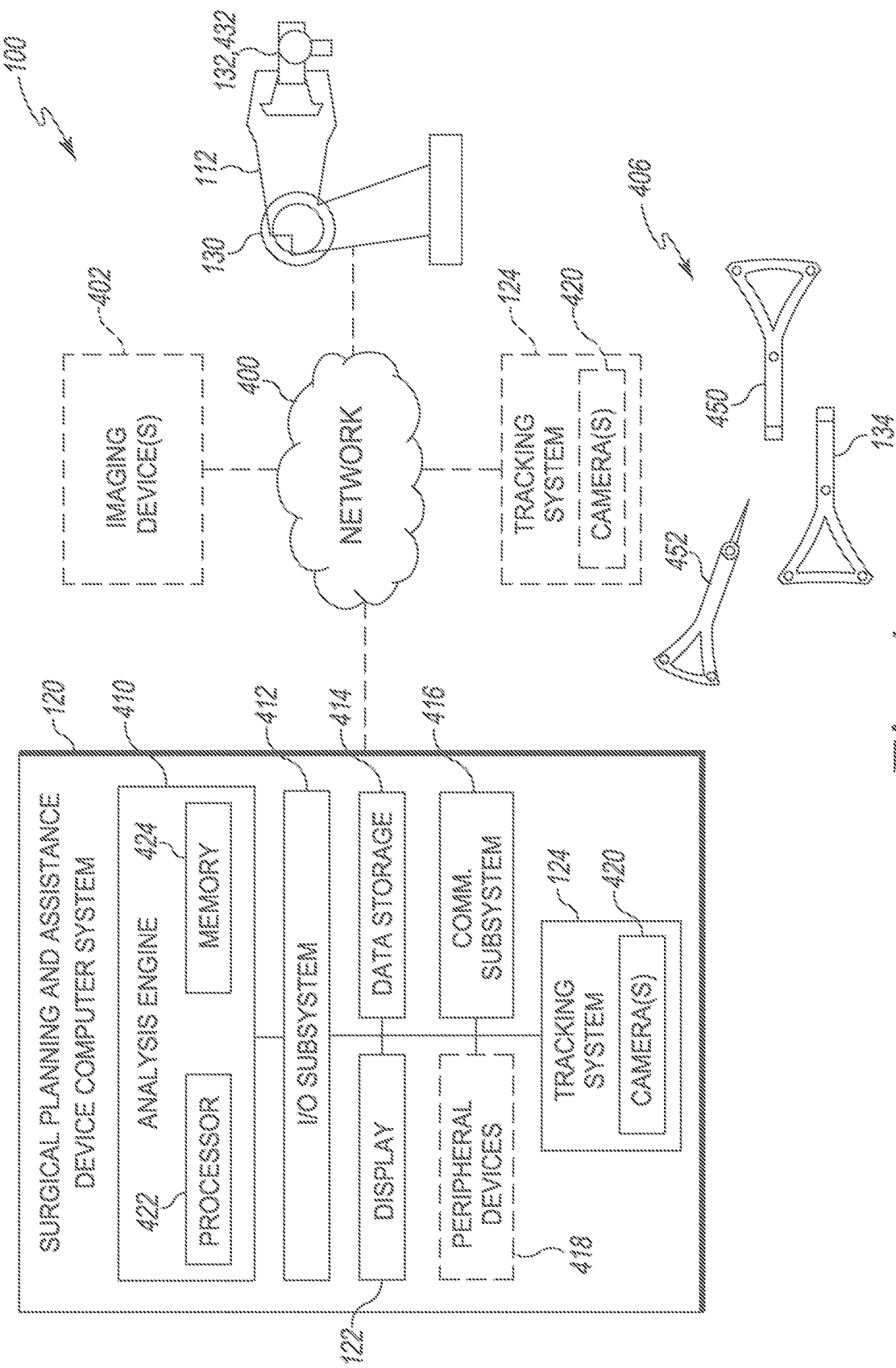
FIG. 4 is a block diagram of the system of FIG. 1.

Referring now to FIG. 4, the illustrative surgical computer system 100 includes the surgical planning and assistance computer system 120 and the robotic-assisted surgical device 112, which communicate with each other over a wired or wireless network 400. The surgical computer system 100 may also include a remote imaging device 402 (e.g., a magnetic resonance imaging (MRI) device, an X-ray device, etc.) and/or a secondary tracking system 124, each of which may communicate with the surgical planning and assistance computer system 120 over the network 400. Additionally, the surgical computer system 100 includes multiple navigation markers 406, which include the navigation marker 134 attached to the robotic-assisted surgical device 112 and the navigation marker 134 attached to the surgical tool 132. Furthermore, as discussed above, the surgical computer system 100 may also include one or more satellite stations, which may include a duplicate display 122 and associated input devices to facilitate interaction by the orthopaedic surgeon within the surgical sterile envelope.

The surgical planning and assistance computer system 120 may be embodied as any type of computer system capable of performing the functions described herein. For example, the surgical planning and computer system 120 may be embodied as, without limitation, a workstation, a desktop computer, a laptop computer, a special-purpose compute device, a server, a rack-mounted server, a blade server, a network appliance, a web appliance, a tablet computer, a smartphone, a consumer electronic device, a distributed computing system, a multiprocessor system, and/or any other computing device capable of performing the functions described herein. As discussed above, in the illustrative embodiment, the surgical planning and assistance computer system 120 forms a portion of, or is otherwise included in, the base station 110.

Although the surgical planning and assistance computer system 120 is illustrated in FIG. 4 as embodied as a single computer, it should be appreciated that the surgical planning and assistance computer system 120 may be embodied as multiple devices cooperating together to facilitate the functionality described below. For example, in some embodiments, the surgical planning and assistance computer system 120 may be embodied as a "virtual server" formed from multiple computer systems distributed across a network and operating in a public or private cloud.

As shown in FIG. 1, the illustrative surgical planning and assistance computer system 120 includes an analysis engine 410, an input/output ("I/O") subsystem 412, a data storage 414, a communication system 416, the display 122, the tracking system 124, and, in some embodiments, one or more peripheral devices 418. Of course, the analysis engine 410 may include additional or other components, such as those commonly found in a typical computer device, in other embodiments. Additionally, in some embodiments, one or more of the illustrative components may be incorporated in, or otherwise form a portion of, another component.

The analysis engine 410 may be embodied as any type of controller, functional block, digital logic, or other component, device, circuitry, or collection thereof capable of performing the functions described herein. In illustrative embodiment, the analysis engine 410 includes a processor 422 and a memory 424. The processor 422 may be embodied as any type of processor capable of performing the functions described herein. For example, the processor 422 may be embodied as a single or multi-core processor(s), digital signal processor, microcontroller, or other processor or processing/controlling circuit. Similarly, the memory 424 may be embodied as any type of volatile and/or non-volatile memory or data storage capable of performing the functions described herein. In operation, the memory 424 may store various data and software used during operation of the surgical planning and assistance computer system 120 such as operating systems, applications, executable software, programs, libraries, and drivers, which may be executed or otherwise used by the processor 422.

The analysis engine 410 is communicatively coupled to other components of the computer system 120 via the I/O subsystem 412, which may be embodied as circuitry and/or components to facilitate input/output operations between the analysis engine 410 (e.g., the processor 422 and the memory 424) and the other components of the computer system 120. For example, the I/O subsystem 412 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 412 may form a portion of a system-on-a-chip (SoC) and be incorporated, along with the analysis engine 410 (e.g., the processor 422 and the memory 424) and other components of the computer system 120, on a single integrated circuit chip. Additionally, in some embodiments, the memory 424, or portions of the memory 424, may be incorporated into the processor 422.

The data storage 414 may be embodied as any type of device or devices configured for short-term and/or long-term storage of data such as, for example, solid-state drives, hard disk drives, memory devices and circuits, memory cards, non-volatile flash memory, or other data storage devices. For example, in the illustrative embodiment, the data storage 414 may store medical images and/or associated three-dimensional models of the patient's knee joint.

The communication subsystem 416 may be embodied as any type of communication circuit, device, or collection thereof, capable of enabling communications between the surgical planning and assistance computer system 120 and the robotic-assisted surgical device 112 and/or imaging device 402 and/or other devices of the surgical computer system 100. To do so, the communication subsystem 416 may be configured to use any one or more communication technologies (e.g., wireless or wired communications) and associated protocols (e.g., Ethernet, Bluetooth®, Wi-Fi®, WiMAX, LTE, 5G, etc.) to effect such communication.

The display 122 may be embodied as any type of display capable of displaying digital images or other information, such as a liquid crystal display (LCD), a light emitting diode (LED), a plasma display, a cathode ray tube (CRT), or other type of display device. In some embodiments, the display 122 may be coupled to a touch screen to allow user interaction with the surgical planning and assistance computer system 120.

As discussed above, the surgical planning and assistance computer system 120 includes the tracking system 124, which is configured to determine a location in three-dimensional space of the robotic-assisted surgical device 112 and the bones (i.e., femur and tibia) of the patient's knee joint based by sensing the location of associated navigation markers 406 (e.g., the navigation marker 134 attached to the surgical tool 132). To do so, the tracking system 124 includes one or more cameras 420, each of which may be embodied as a digital camera or other digital imaging device capable of tracking one or more of the navigation markers 406. To do so, each camera 420 includes an electronic image sensor, such as an active-pixel sensor (APS), e.g., a complementary metal-oxide-semiconductor (CMOS) sensor, or a charge-coupled device (CCD). In the illustrative embodiment, the tracking system 124 includes multiple cameras 420 arranged in an array so as to be capable of determining distance to objects imaged by the cameras 420.

The robotic-assisted surgical device 112 may be embodied as any type of robot or similar machine capable of performing the functions described herein. Illustratively, the robotic-assisted surgical device 112 is embodied as a robotic arm configured to be attached to the surgical table 104 or otherwise positioned near the patient 102 during the orthopaedic surgical procedure. As discussed above, the robotic-assisted surgical device 112 includes the surgical tool 132, which is illustratively embodied as a surgical saw 142, and the automated positioning system 130, which is configured to control the positioning of the surgical saw 142. In use, the robotic-assisted surgical device 112 supports the surgical saw 142 and may constrain movement of the surgical saw 142 within a resection plane specified in an associated surgical plan. The orthopedic surgeon may activate the surgical saw 142 and perform the resection with the surgical saw 142 while the robotic-assisted surgical device 112 constrains movement of the surgical saw 142 to the resection plane. Although illustrated with a surgical saw 142, it should be understood that, in other embodiments, the surgical tool 132 may be embodied as, or otherwise include, other surgical instruments, such as, for example, surgical burrs, impactors, reamers, and other powered surgical tools. The surgical planning and assistance computer system 120 and the robotic-assisted surgical device 112 may illustratively be embodied as a VELYS™ Robotic-Assisted Solution, commercially available from DePuy Synthes Products, Inc. of Warsaw, Indiana.

The surgical planning and assistance computer system 120 and the robotic-assisted surgical device 112 may be configured to transmit and receive data with each other and/or other devices of the surgical computer system 100 over the network 400. The network 400 may be embodied as any number of various wired and/or wireless networks. For example, the network 400 may be embodied as, or otherwise include, a direct wired connection, a wired or wireless local area network (LAN), a wired or wireless wide area network (WAN), a cellular network, and/or a publicly-accessible, global network such as the Internet. As such, the network 400 include any number of additional devices, such as additional computers, routers, stations, and switches, to facilitate communications among the devices of the surgical computer system 100.

As discussed above, the surgical planning and assistance computer system 120 is configured to track the location of the robotic-assisted surgical device 112 and the bones (i.e., femur and tibia) of the patient's knee joint using the navigation markers 406. Each navigation marker 406 includes a number of hydrophobic optical reflectors arranged in a predetermined pattern visible to the cameras 420 of the tracking system 124. Illustratively, the navigation markers 406 include the navigation marker 134 attached to the robotic-assisted surgical device 112, the navigation marker 134 attached to the surgical tool 132, and a plurality of navigation markers 450, each of which is configured to be attached to a corresponding bone of the patient 102. The navigation markers 406 also include a navigation pointer marker 452 configured to be temporarily positioned by a surgeon relative to anatomical features or landmarks of the patient (e.g., with an end of the pointer marker 452 in contact those anatomical features/landmarks) while the pointer marker 452 is observed by the cameras 420. In this way, the navigation markers 406 may be used for registration and tracking of the patient's bony anatomy during the orthopaedic surgical procedure.

Figure 5A:
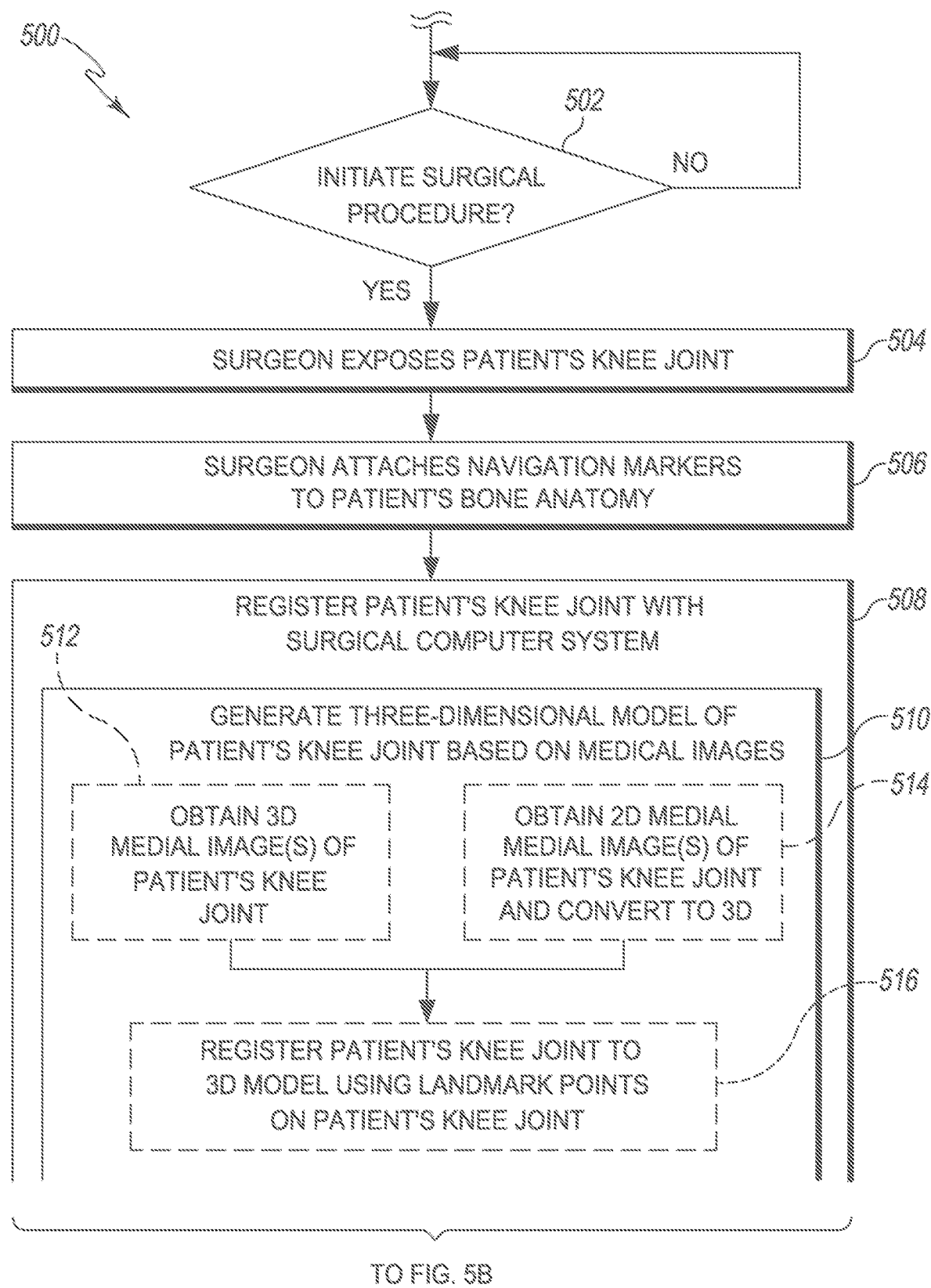
FIGS. 5A-5E are simplified block diagrams of at least one embodiment of a method for compensation for bone loss of a patient's knee joint during performance of an associated orthopaedic surgical procedure.
Figure 5B:
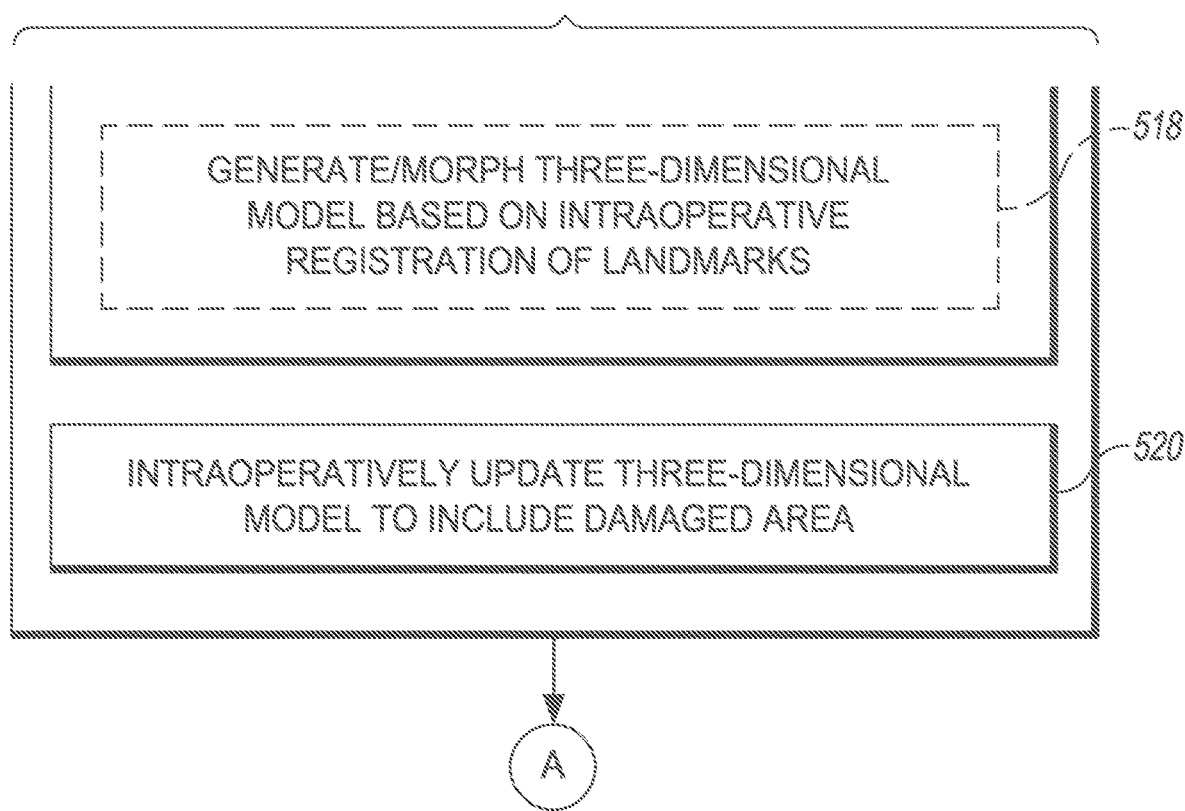
Figure 5C:
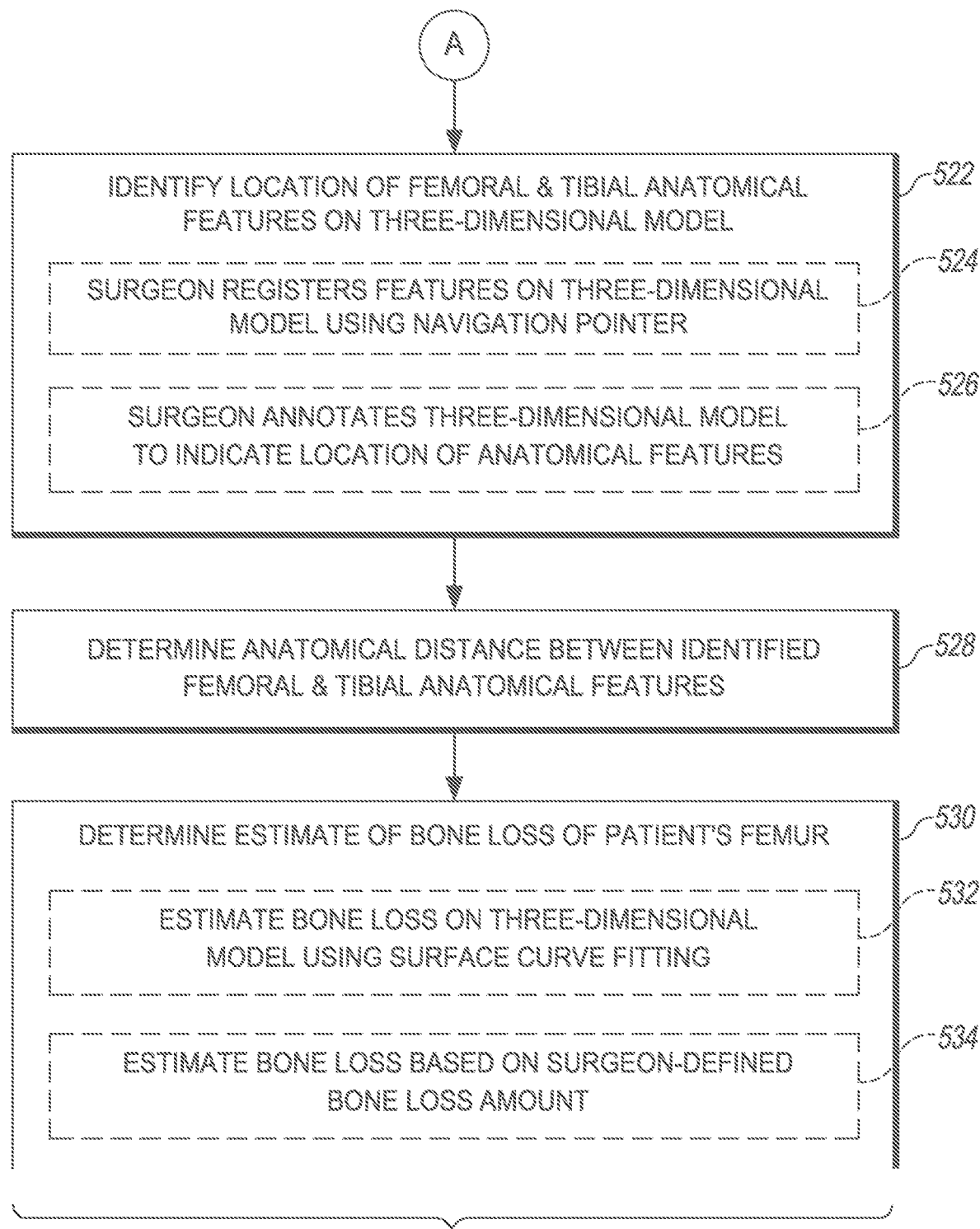

Referring now to FIGS. 5A-5C, in use, the surgical planning and assistance computer system 120 may perform a method 500 for compensating for bone loss of a patient's knee joint during performance of an associated orthopaedic surgical procedure. The method 500 begins with block 502 in which the computer system 120 determines whether to initiate the surgical procedure. For example, the computer system 120 may prompt the orthopaedic surgeon for confirmation to begin. As discussed above, the orthopaedic surgeon may interact with the computer system 120 via the base station 110 or, if during the performance of the orthopaedic surgeon, via a protected satellite station located in the surgical envelope.

In block 504, the orthopaedic surgeon exposes the patient's knee joint and, in block 506, attaches a navigation marker 450 to each of the patient's femur 200 and tibia 700. As discussed above, the navigation markers 450 allow the tracking of the relative position of the patient's femur 200 and tibia 700 via the tracking system 124.

After the orthopaedic surgeon has attached the navigation markers 450 to the patient's boney anatomy, the surgeon registers the patient's knee joint with the computer system 120 in block 508. Registration of the patient's knee joint allows the surgical computer system 120 to properly track the patient's knee joint so as to display a three-dimensional model of the patient's knee joint in the proper corresponding orientation and position. Various methodologies may be used to register the patient's knee joint to the surgical computer 120.

For example, in the illustrative embodiment, a three-dimensional model of the patient's knee joint is generated in block 510. To do so, in some embodiments, the surgical computer system 120 may obtain three-dimensional medical images (e.g., images generated by a magnetic resonance imaging MRI device), which may be used directly as the three-dimensional model itself (i.e., with little or no further processing). Alternatively, in block 514, the surgical computer system 120 may obtain two-dimensional medical images (e.g., images generated by an X-ray device), which may be subsequently converted to a three-dimensional image by stitching or otherwise combining the two-dimensional images. In yet other embodiments, the set of two dimensional images may be used directly as an approximation of a three-dimensional model. Regardless, it should be appreciated that the two- or three-dimensional medical images may be generated or otherwise obtained pre-operatively or intra-operatively (i.e., the blocks 512, 514 may occur prior to or subsequent to the block 504). In the illustrative embodiment, the medical images are generated by the imaging device 402 and transmitted to the computer system 120 over the network 400.

Figure 6:
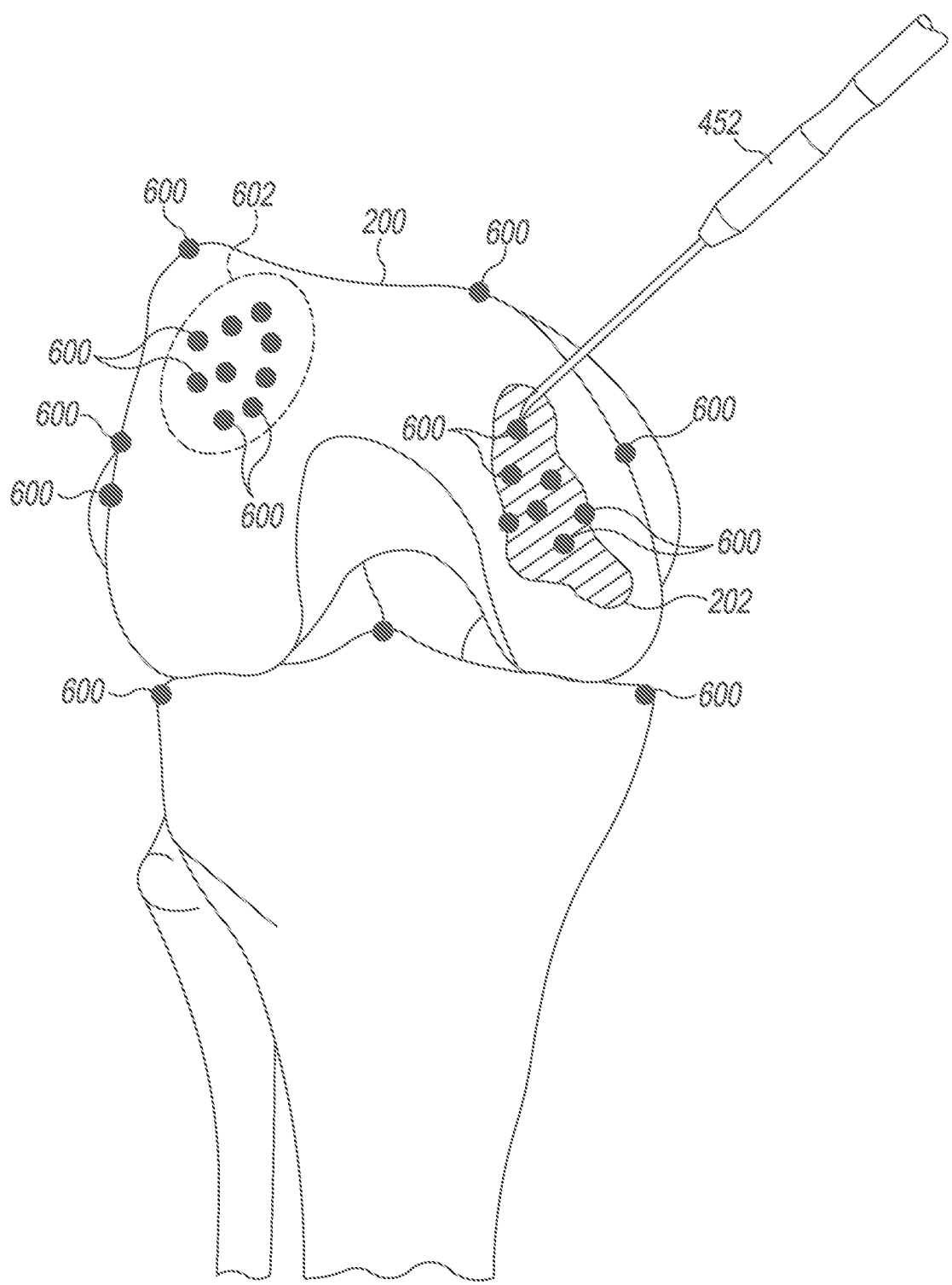
FIG. 6 is an elevation view of the patient's knee joint in a flexed orientation and identifying registered anatomical locations and landmarks using a navigation pointer.

Subsequently, in block 516, the patient's knee is registered to the three-dimensional model. Registration of the patient's knee to the three-dimensional model allows the surgical computer system 120 to properly orient the three-dimensional model on the display 122 such that the three-dimensional model tracks the positioning of the patient's knee joint in three-dimensional space (e.g., as the orthopaedic surgeon articulates the patient's knee joint). To do so, in the illustrative embodiment, the surgeon may intraoperatively register anatomical points or landmarks of the patient's femur and tibia to the computer system using the navigation pointer 452. For example, as shown in FIG. 6, the surgeon may contact a pointer end or tip of the navigation pointer 452 to various anatomical landmarks or sites 600 on the patient's femur and tibia. Once so placed and in response to an activation command or input from the surgeon, the computer system 120 determines the location of the pointer end of the navigation pointer 452 on the three-dimensional model based on the location of the navigation pointer 452 in three-dimensional space as tracked by the tracking system 124. In this way, the contacted anatomical landmark is associated with or otherwise correlated to a corresponding point on the three-dimensional model. In some embodiments, the surgical computer system 120 is configured to walk the orthopaedic surgeon through a registration process by requesting the surgeon identify, using the navigation pointer 452, particular anatomical landmarks on the patient's femur and/or tibia.

Alternatively, in other embodiments, the three-dimensional model of the patient's knee joint may be generated intra-operatively in block 518 (see FIG. 5B). For example, the patient's knee joint may registered to a three-dimensional model of a generic knee joint. To do so, the orthopaedic surgeon may contact the navigation pointer 452 to a large number of anatomical landmarks 600 and/or "paint" the surface of the patient's femur/tibia by moving the navigation pointer around area of interest (or substantially the entirety of the patient's femur and/or tibia). For example, as shown in FIG. 6, for areas of particular interest that the surgeon desires to have an increased accuracy, the surgeon may generate a set of highly clustered registration points 600 as shown in the location 602. In some embodiments, the generic three-dimensional model may be "morphed" or otherwise modified based on the set of registration points 600 to provide a better indication of the patient's actual boney anatomy.

Regardless of how the three-dimensional model is generated in block 510, the model may be updated in block 520 to include indicia of the damaged area 202 in some embodiments. To do so, similar to block 518, the orthopaedic surgeon may contact the pointer end or tip of the navigation pointer 452 to multiple locations of the damaged area 202 of the patient's femur 200 so as to "paint" the damaged area 202. Such "painting" of the damaged area 202 using the navigation pointer 452 improves the granularity of the mapping of that area on the three-dimensional model of the patient's femur 200 via the registration of the highly clustered points 600. In this way, the three-dimensional model of the patient's knee joint (e.g., of the femur 200) may include visual indicia of the damaged area 202 when displayed on the display 122.

After the three-dimensional model of the patient's knee joint has been registered to the surgical computer system 120 in block 508, the method 500 advances to block 522 of FIG. 5C. In block 522, the computer system 120 identifies, on the three-dimensional model, the location of the femoral and tibial anatomical features that are to be used to determine that anatomical distance indicative of the tension of the patient's collateral ligaments. As discussed above, in some embodiments, the anatomical features may be embodied as the femoral and tibial attachment points of the medial collateral ligament (MCL) and the lateral collateral ligament (LCL). In other embodiments, the attachment features may be embodied as the tibial attachment point of the MCL/LCL and a point or site on the patient's tibia that corresponds to the planned tibial resection plane.

For example, in some embodiments, the anatomical features may be embodied as the femoral and tibial attachment points of the medial and lateral collateral ligaments and, in such embodiments, the anatomical distance (i.e., the distance between the femoral and tibial attachment points of the collateral ligaments) is indicative of the patient's collateral ligament length(s). In other embodiments, other anatomical features may be used such as the femoral attachment point of the collateral ligaments and a location on the patient's tibia corresponding to a planned tibial resection plane (or other femoral and/or tibial locations).

Figure 7:
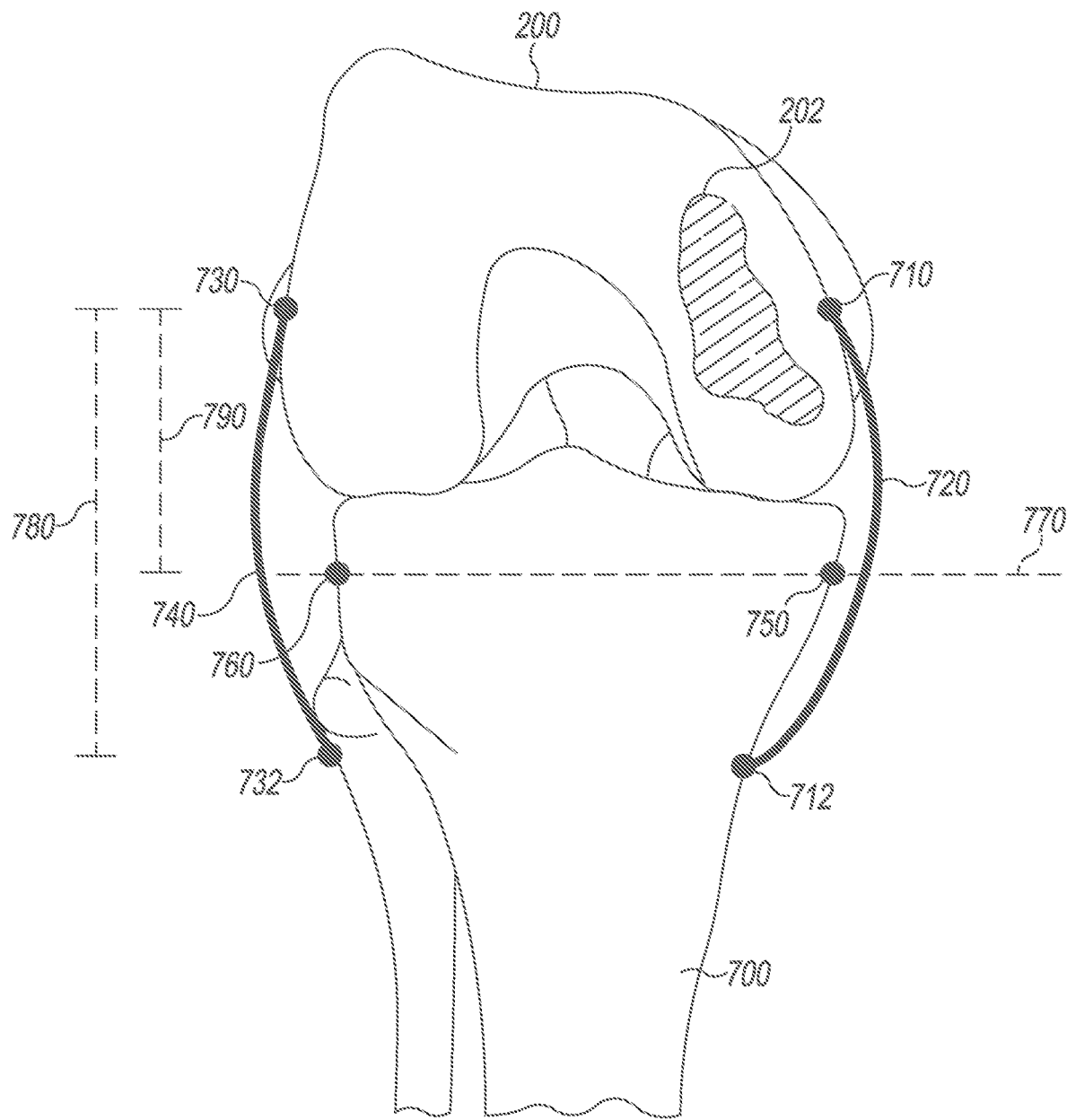
FIG. 7 is an elevation view of the patient's knee joint in a flexed orientation and showing the medial and lateral collateral ligaments.

The computer system 120 may utilize any suitable methodology to determine the location of the anatomical features on the three-dimensional model. For example, in block 524, the orthopaedic surgeon may utilize the navigation pointer 452 to identify the location of the anatomical features (e.g., attachment points) to the computer system 120. For example, as discussed above in regard to FIG. 6, the orthopaedic surgeon may contact a pointer end of the navigation pointer 452 on the anatomical feature of the patient's knee joint (i.e., via the exposed knee joint) and, in response to an activation command or input, the computer system 120 determines the location of the pointer end on the three-dimensional model based on the location of the navigation pointer 452 in three-dimensional space as tracked by the tracking system 124. For example, as shown in FIG. 7, the orthopaedic surgeon may, in turn, contact the navigation pointer 452 on an attachment site 710 of the medial collateral ligament 720 to the patient's femur 200, on an attachment site 704 of the medial collateral ligament 720 to the patient's tibia 700, on an attachment site 730 of the lateral collateral ligament to the patient's femur 200, and on an attachment site 732 of the lateral collateral ligament to the patient's tibia 700 to register each of the attachment sites to the computer system 120 as discussed above.

Again, as discussed above, other anatomical features may be used in other embodiments. For example, in some embodiments, the attachment site 710 of the medial collateral ligament to the patient's femur 200 may be used along with an anatomical feature or location 750 on the patient's tibia 700 and the attachment site 730 of the lateral collateral ligament of the patient's femur 200 may be used along with an anatomical feature or location 760 on the patient's tibia 700. As discussed above, the anatomical features 750, 760 may correspond to a planned or determined tibial resection plane 770.

Referring back to FIG. 5C, additionally or alternatively, the orthopaedic surgeon may annotate the three-dimensional model itself with indicia of the location of the anatomical features in block 526. For example, the orthopaedic surgeon may mark the approximated location of the attachment sites of the patient's MCL and LCL on the three-dimensional model based on an examination of the patient's exposed knee joint.

Regardless, after the anatomical features have been identified and registered with the computer system 120, the method 500 advances to block 528. In block 528, the computer system 120 determines the anatomical distance between the identified anatomical features. For example, as shown in FIG. 7, the computer system 120 may determine an anatomical distance 780 between the attachment site 730 of the lateral collateral ligament to the patient's femur 200 and the attachment site 732 of the lateral collateral ligament to the patient's tibia 700. Alternatively, the computer system 120 may determine anatomical distance 790 between the attachment site 730 of the lateral collateral ligament to the patient's femur 200 and a planned tibial resection plane 770. The planned tibial resection plane 770 may be determined using any suitable methodology such as based on a specified distance below the distal-most point on the medial and/or lateral tibial plateau. Additionally, the planned tibial resection plane 770 may be angled in various planes (e.g., the planned tibial resection plane 770 may be perpendicular to the longitudinal axis of the tibia in the coronal plane and sloped posteriorly relative to the longitudinal axis of the tibia in the sagittal plane). Furthermore, it should be appreciated that the computer system 120 may also determine an anatomical distance for the medial side of the patient's knee joint in the same manner. Additionally, as discussed above, it should be appreciated that the determined anatomical distance is indicative of the length of the corresponding medial/lateral collateral ligament, which is itself indicative of the tension of such ligament.

Figure 8:
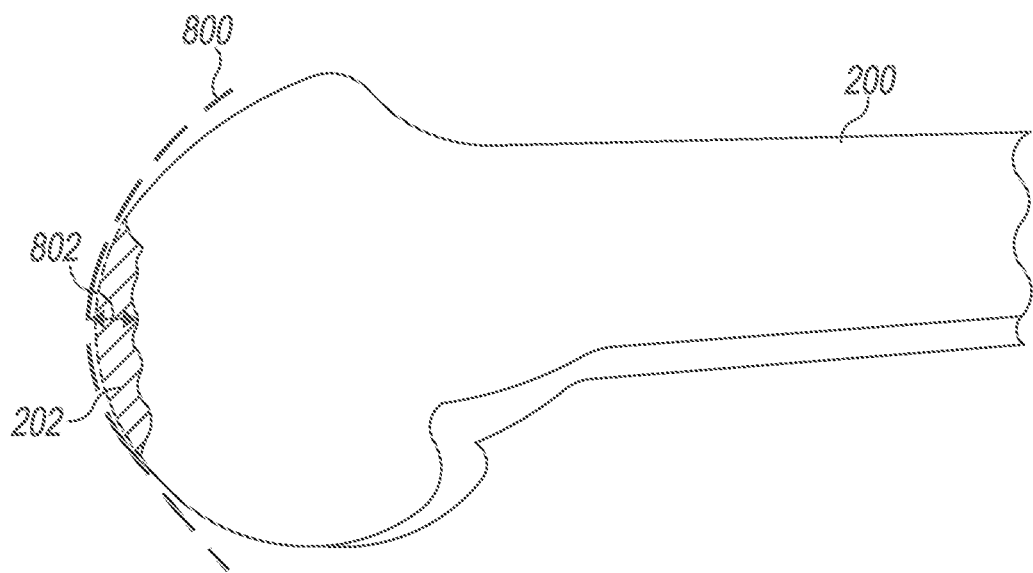
FIG. 8 is a three-dimensional model of the damaged femur of the patient's knee joint of FIG. 2 including indicia of an estimated amount of bone loss of the patient's knee using a surface curve fitting algorithm, which may be generated using the system of FIG. 1.

Subsequently, in block 530, the computer system 120 determines an estimate of the bone loss of the patient's femur (and/or tibia). To do so, the computer system 120 may utilize one or more methodologies to estimate the amount of bone loss of the patient's bone based on the three-dimensional model of the patient's knee joint. In some embodiments in block 532, for example, the computer system 120 may estimate the amount of bone loss of the patient's femur 200 (and/or tibia 700) on the three-dimensional model of the patient's knee joint based on a surface curve fitting algorithm. For example, as shown in FIG. 8, the computer system 120 may be configured to use a curve-fitting algorithm to determine a surface curvature 800 that approximates the exterior curvature of the patient's healthy femur 200 (and/or tibia 700). The curve-fitting algorithm may identify the best-fitted surface curvature 800 by matching the surface curvature 800 to "healthy" portions of the patient's femur 200. The amount of bone loss may be then be determined based on a distance 802 between the damaged surface of the patient's femur 200 and the fitted surface curvature 800. As discussed in more detail below, the determined amount of bone loss may be based on, or otherwise vary according to, a degree of flexion established between the patient's femur 200 and tibia 700. For example, as shown in FIG. 7, less bone loss has occurred toward the anterior and posterior sides of the damaged area 202.

Figure 9:
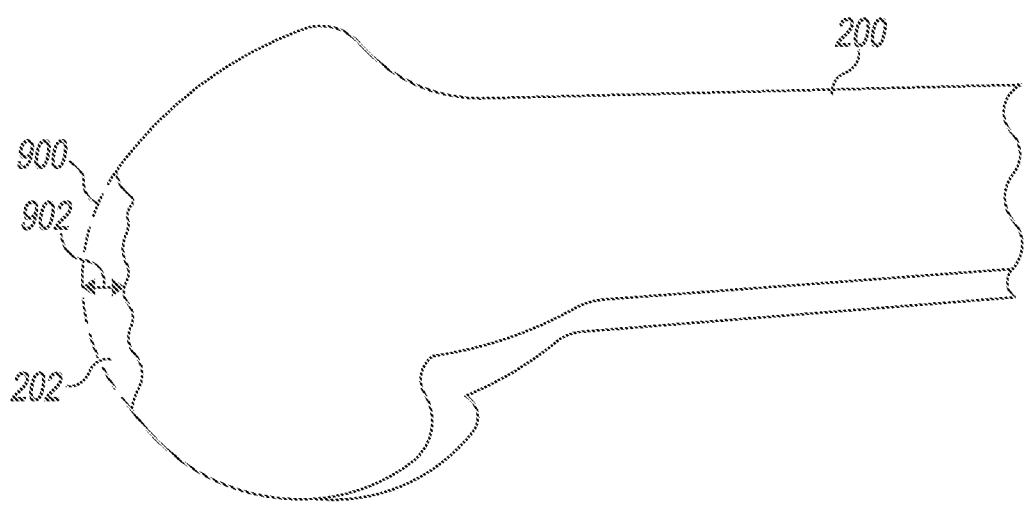
FIG. 9 is a three-dimensional model of the damaged femur of the patient's knee joint of FIG. 2 including indicia of an estimated amount of bone loss of the patient's knee based on a surgeon-defined bone loss amount, which may be generated using the system of FIG. 1.

Referring back to FIG. 5C, in other embodiments in block 534, the computer system 120 may estimate the amount of bone loss of the patient's femur 200 (and/or tibia 700) on the three-dimensional model of the patient's knee joint based on a surgeon-defined bone loss amount. That is, the orthopaedic surgeon may enter an amount of bone loss to be used with the three-dimensional model. For example, as shown in FIG. 9, the surgeon-defined bone loss amount may define a distance 902 between the damaged area/surface 202 of the patient's femur 200 and an approximated surface 900 of the patient's healthy femur 200. To facilitate the determination of the approximated surface 900, the surgeon-defined bone loss amount may be supplied to the computer system 120 in associated with a degree of flexion (e.g., 2 millimeters at 0 degrees of flexion and 0.5 millimeters at 45 degrees of flexion) such that the surface 900 may be approximated.

Figure 5D:
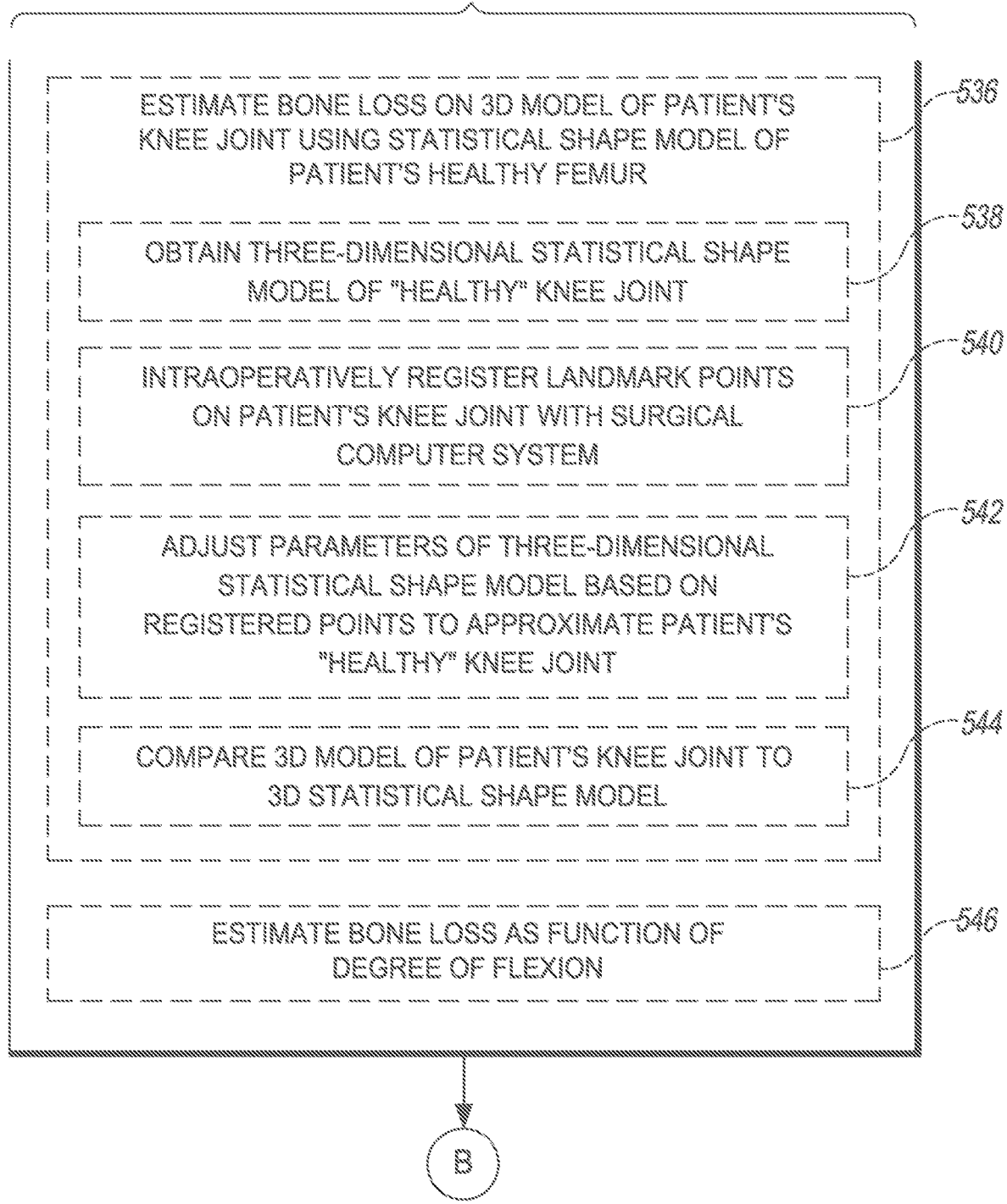

Referring now to FIG. 5D, in other embodiments in block 536, the computer system 120 may estimate the amount of bone loss of the patient's femur 200 (and/or tibia 700) on the three-dimensional model of the patient's knee joint using a three-dimensional statistical shape model of the patient's "healthy" femur. To do so, in block 538, the computer system 120 may obtain a three-dimensional statistical shape model of a generic "healthy" knee joint. The three-dimensional statistical shape model may be developed or generated using one of a number of different methodologies. For example, in the illustrative embodiment, the statistical shape model is developed based on a collection of medical images of "healthy" knee joints (e.g., from a pool of healthy patients) and parametrized to allow "morphing" of the shape model by adjusting the associated parameters such that the three-dimensional model approximates (e.g., size and shape) the patient's "healthy" femur 200 (i.e., prior to the damage of the damage area 202).

Subsequently, in block 540, the patient's knee joint is registered to the three-dimensional statistical shape model. To do so, a registration process similar to that described above in regard to blocks 516 and 518 may be used. That is, the orthopaedic surgeon may contact the navigation pointer 452 to particular anatomical landmarks 600 of the surface of the patient's femur/tibia. In response to the registration of the anatomical landmarks/sites to the computer system 120, the parameters of the three-dimensional statistical shape model are adjusted based on the registered sites in block 542. The adjusted parameters "morphs" or otherwise modifies the three-dimensional statistical shape model to approximate the shape of the patient's actual boney anatomy.

Figure 10:
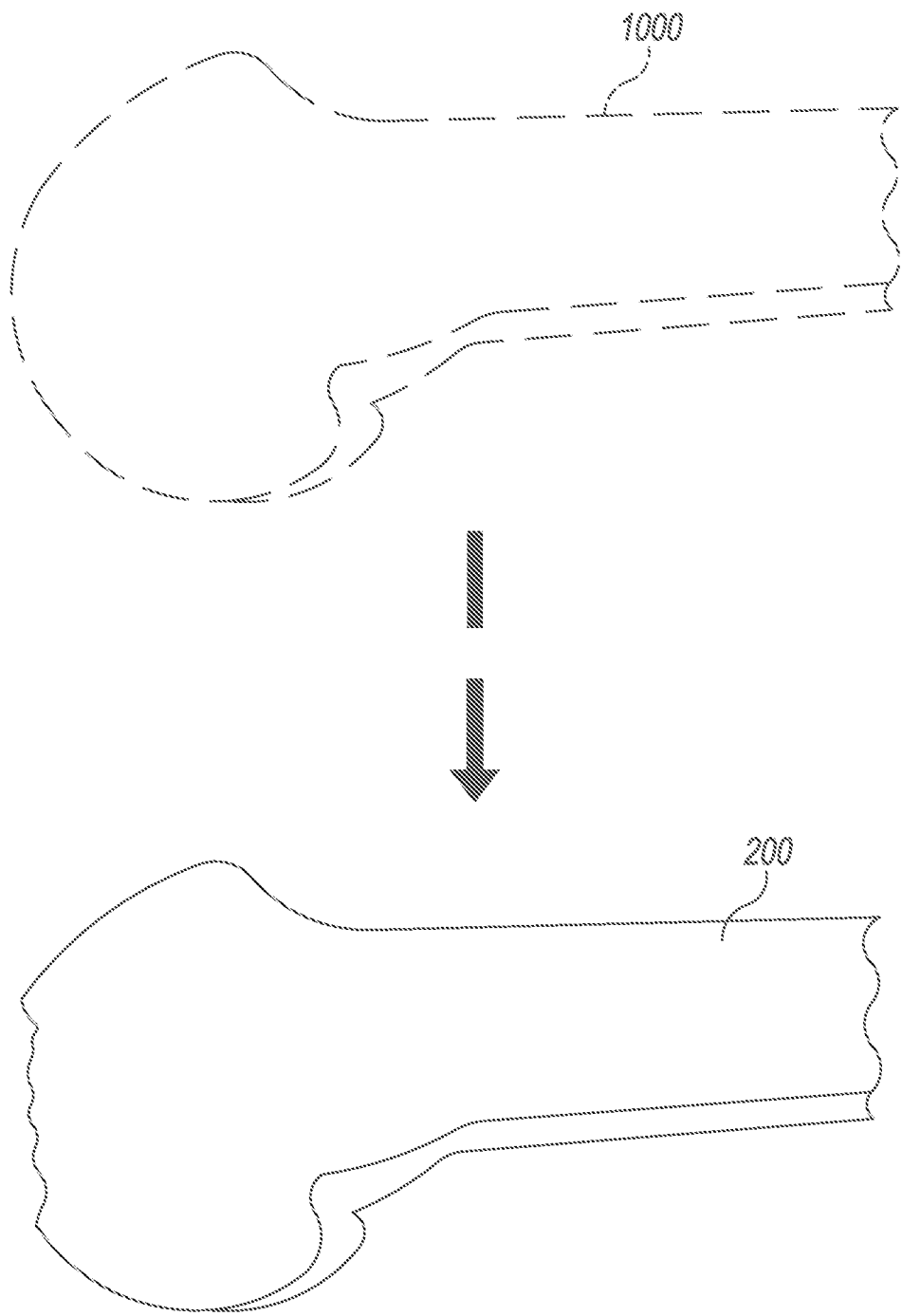
FIG. 10 is an illustration of a three-dimensional statistical shape model of a reference or generic femur that has been adjusted to approximate the patient's "healthy" femur in the process of being compared to (e.g., superimposed over) a three-dimensional model of the damaged femur of the patient's knee joint of FIG. 2 to provide indicia of an estimated amount of bone loss of the patient's knee, which may be performed using the system of FIG. 1.
Figure 11:
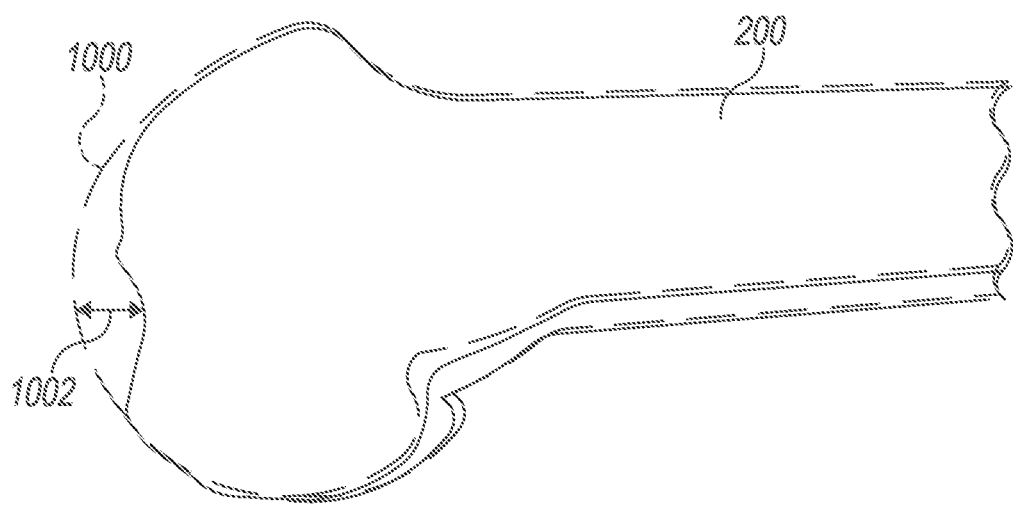
FIG. 11 is an illustration of the three-dimensional statistical shape model that approximates the patient's "healthy" femur of FIG. 10 superimposed over the three-dimensional model of the damaged femur of the patient's knee joint of FIG. 2 to define indicia of an estimated amount of bone loss of the patient's knee, which may be performed using the system of FIG. 1.

In block 544, the computer system 120 compares the three-dimensional model of the patient's bone (e.g., femur and/or tibia) to the modified three-dimensional statistical shape model and determines or estimates the amount of bone loss based on a difference between the two models in or around that damaged area 202. The computer system 120 may utilize any suitable methodology to compare the two models, such as superimposing one over the other, via various mathematical processes, and so forth. For example, a three-dimensional statistical shape model 1000 of a generic "healthy" femur is shown in FIG. 10 in the process of being superimposed over the three-dimensional model of the patient's damaged femur 200. In FIG. 11, the statistical shape model 1000 has been superimposed over the three-dimensional model of the patient's femur 200, and the computer system 120 is configured to determine the amount of bone loss of the patient's femur 200 based on a distance 1002 between the damaged surface of the patient's femur 200 and the corresponding outer surface of the three-dimensional statistical shape model 1000 of the patient's "healthy" femur. Again, the determined amount of bone loss may be based on, or otherwise vary according to, a degree of flexion established between the patient's femur 200 and/or tibia 700 as discussed below.

Referring back to FIG. 5D, in some embodiments in block 546, the computer system 120 may determine or otherwise estimate the amount of bone loss as a function of the degree of flexion between the patient's femur 200 and tibia 700. That is, as discussed above, the bone loss of the patient's femur 200, relative the patient's tibia 700, may vary as a function of the degree of flexion. For example, in the illustrative embodiments, the relevant bone loss (i.e., the bone loss at the point of contact between the femur 200 and tibia 700) is greatest at 0 degrees of flexion and less at greater degrees of flexion. As such, the computer system 120 may determine an amount of bone loss of the patient's femur 200 throughout a range of flexion or at a collection of particular flexion angles to approximate the range of flexion.

Figure 5E:
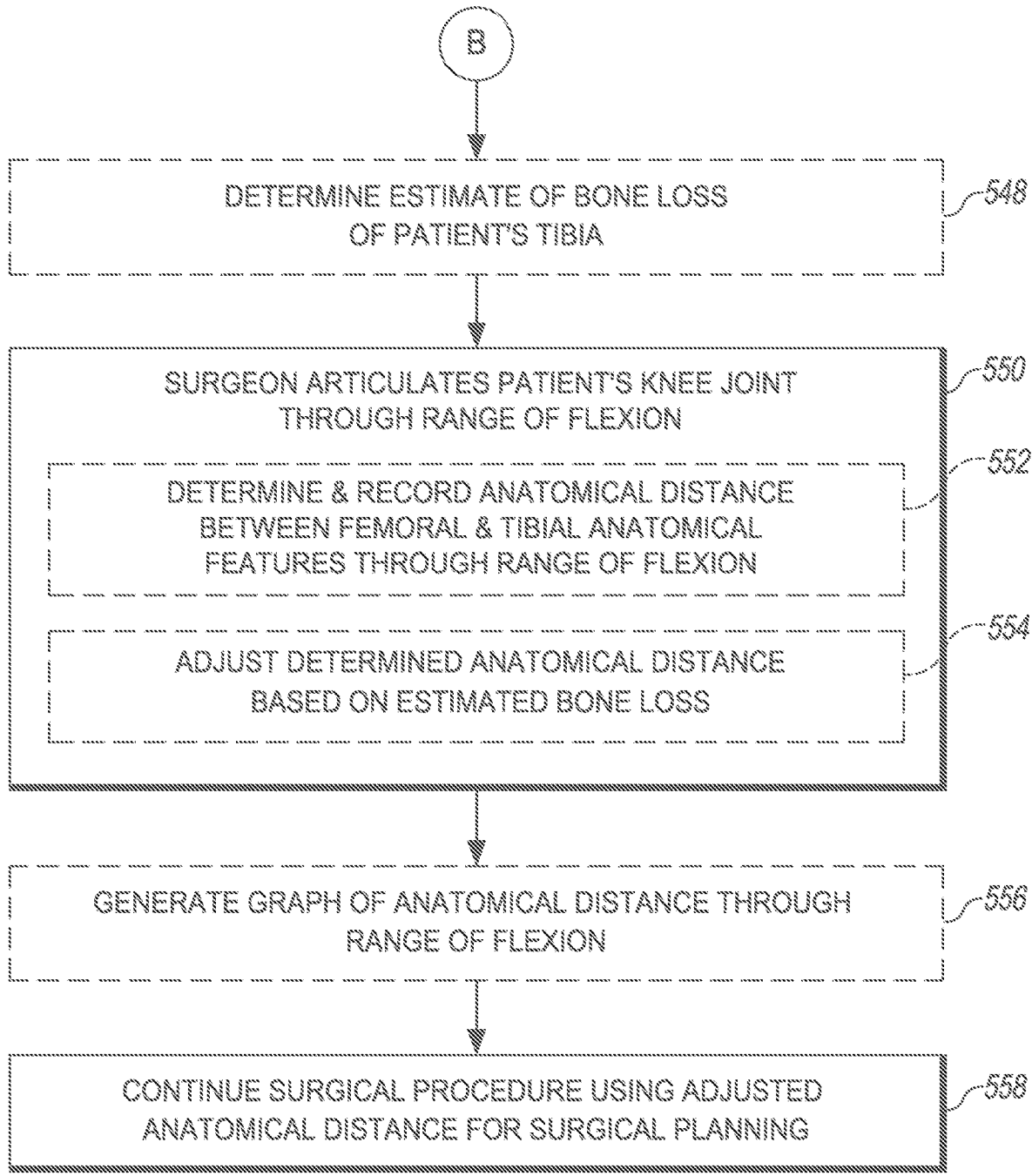

Regardless, after the computer system 120 has determined the estimated amount of bone loss of the patient's bone in block 530, the method 500 advances to block 548 of FIG. 5E. In some embodiments, as discussed above, the patient's tibia 700 may include a damaged articular surface in addition to or rather than the patient's femur 200. In such embodiments, the computer system 120 may be configured to estimate or otherwise determine an amount of bone loss of the patient's tibia in block 548 using a similar methodology as discussed above in regard to the patient's femur 200. For example, the computer system 120 may estimate the amount of bone loss of the patient's tibia 700 based on a surface curve-fitting algorithm, based on a surgeon-defined bone loss amount, or based on a comparison of a three-dimensional statistical shape model of the patient's healthy tibia and a three-dimensional model of the patient's damaged tibia as discussed above.

Figure 12:
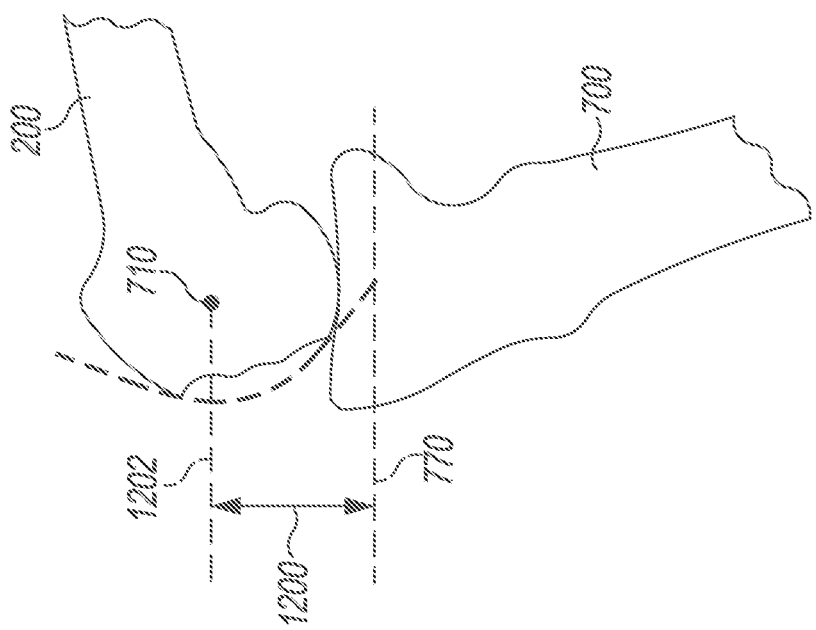
FIG. 12 is a three-dimensional model of a patient's knee joint including the damaged femur of FIG. 2 positioned at an initial degree of flexion such that a healthy portion of the patient's femur is in contact with the patient's tibia.

Subsequently, in block 550, the orthopaedic surgeon articulates the patient's knee joint through a range of flexion and, in block 552, the computer system 120 determines and records the anatomical distance between the identified femoral and tibial anatomical features (e.g., between attachment sites of the medial and lateral collateral ligaments of the patient's knee joint of between the femoral attachment site of the medial and lateral collateral ligament and tibial features indicative of a tibial resection plane). For example, as shown in FIG. 12, the patient's knee joint may be initially positioned in a degree of flexion at which a healthy portion of the patient's femur 200 is in contact with the patient's tibia 700 (i.e., the damaged area 202 of the patient's femur 200 is not in contact with the patient's tibia 700). At such degree of flexion, the computer system 120 may be configured to determine and record the anatomical distance between the identified anatomical features. To do so, in an illustrative embodiment, the computer system 120 is configured to determine a distance 1200 defined between the identified attachment site 710 on the patient's femur 200 of the patient's medial collateral ligament (and the attachment site 730 of the patient's femur 200 of the patient's lateral collateral ligament) and the planned resection plane 770 of the patient's tibia 700. Again, the planned resection plane 770 corresponds to an amount of bone to be removed from the patient's tibia 700 to prepare the proximal end of the tibia 700 for a tibial prosthesis. In other embodiments, however, the computer system 120 may be configured to determine the anatomical distance by determining a distance between the attachment sites 710, 730 of the collateral ligaments on the patient's femur 200 and the attachment sites 712, 732 of the collateral ligaments on the patient's tibia 700 as discussed above.

Regardless, as the orthopaedic surgeon articulates the patient's knee joint through the range of flexion, the computer system 120 continues to determine and record the anatomical distance. For example, in FIG. 13, the orthopaedic surgeon has moved the patient's knee to a lesser degree of flexion at which a portion of the damaged area 202 of the patient's femur 200 is now in contact with the patient's tibia 700. As such, due to the bone loss occurring in the damaged area 202, the patient's femur 200 sits at a lower position on the tibia 700 relative to the patient's healthy femur and a distance 1300 defined between the identified attachment site 710 on the patient's femur 200 and the planned resection plane 770 of the patient's tibia 700 is less than the distance 1200 of FIG. 12. Furthermore, as shown in FIG. 14, at full extension, the damaged area 202 of the patient's femur 200 is in full contact with the patient's tibia 700 and, as such, the patient's femur 200 sits at an even lower position on the tibia 700 relative to the patient's healthy femur. Additionally, a distance 1400 defined between the identified attachment site 710 on the patient's femur 200 and the planned resection plane 770 of the patient's tibia 700 is less than the distance 1300 of FIG. 13 and the distance 1200 of FIG. 12.

Figure 13:
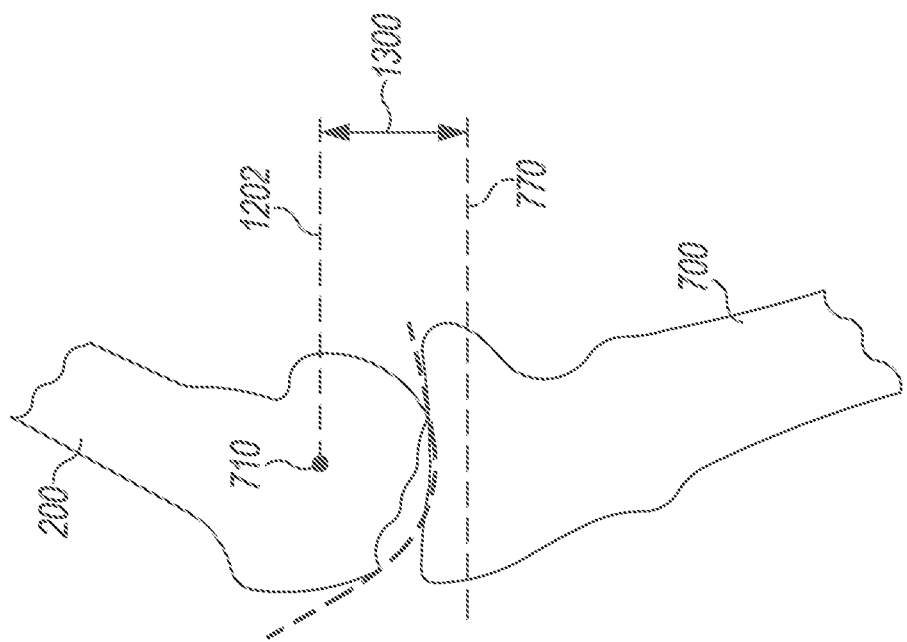
FIG. 13 is a three-dimensional model of a patient's knee joint including the damaged femur of FIG. 2 rotated to a degree of flexion at which the damaged portion of the patient's femur of FIG. 2 has come into contact with the patient's tibia.

Referring now back to FIG. 5E, it should be appreciated that, due to the damaged area 202 of the patient's femur 200, the anatomical distance identified in FIGS. 13 and 14 are less or otherwise reduced relative to the same anatomical distance of the patient's healthy knee joint. As such, in block 554, the computer system 120 is configured to adjust the determined anatomical distance based on the amount of bone loss estimated in block 530. To do so, the computer system 120 may be configured to increase the measured or identified anatomical distance by the estimated amount of bone loss. For example, as shown in FIG. 15, the distance 1400 defined between the identified attachment site 710 on the patient's femur 200 and the planned resection plane 770 of the patient's tibia 700 is increased by a distance 1502 to define a new distance 1500 between the identified attachment site 710 on the patient's femur 200 and the planned resection plane 770 of the patient's tibia 700. As shown via comparison of FIGS. 14 and 15, the distance 1500 is greater than the distance 1400, implying an increase in the determined anatomical distance. Again, as discussed above, the amount at which the determined anatomical distance is increased (i.e., the estimated amount of bone loss) may be based on the particular degree of flexion. For example, in the illustrative embodiment, the determined anatomical distance is increased more at extension of the patient's knee joint as shown in FIG. 15 than at a degree of flexion of the patient's knee joint as shown in FIG. 13.

Figure 16:
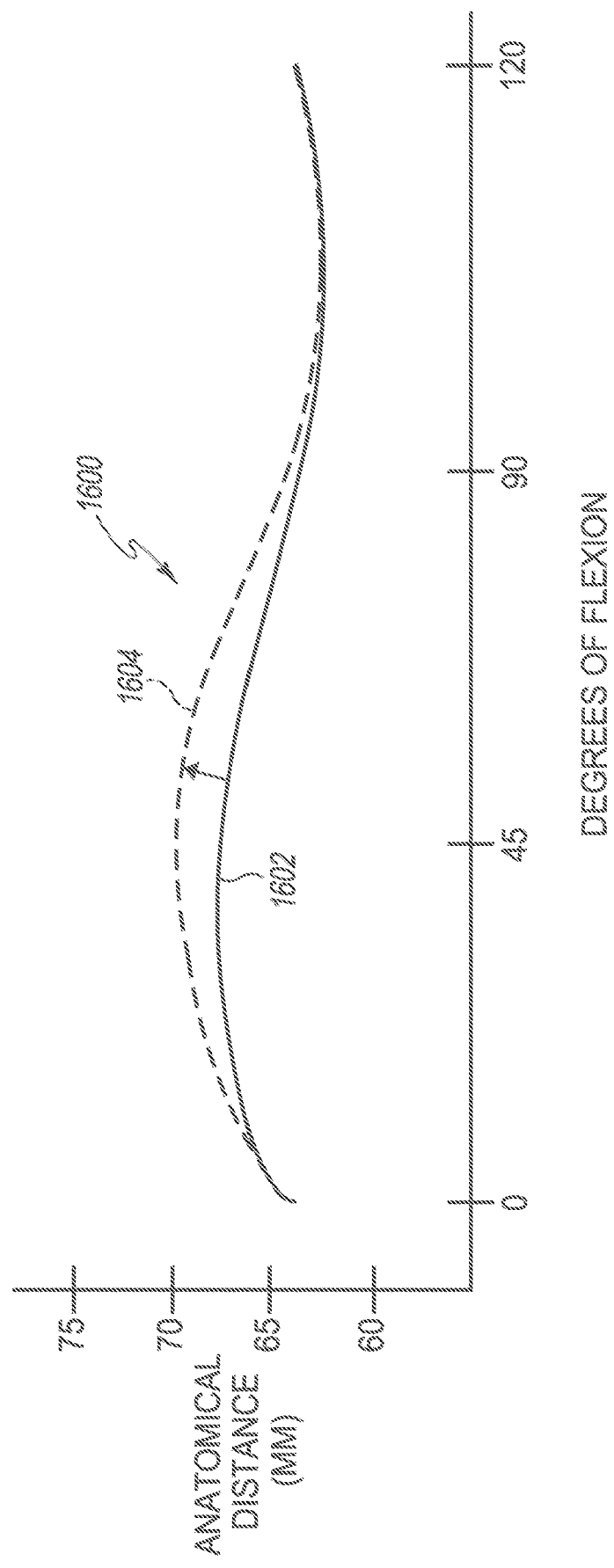
FIG. 16 is a simplified plot diagram illustrating a present anatomical distance between anatomical features of the femur and tibia of the patient's knee joint including the damaged femur of FIG. 2 through a range of flexion and an adjusted or target anatomical distance through the range of flexion based on the estimated amount of bone loss.

Referring now back to FIG. 5E, after the computer system 120 has adjusted the determined anatomical distance of the patient's knee joint based on the estimated amount of bone loss in block 546, the computer system 120 may generate a graph of anatomical distance through the range of flexion in block 556. For example, as shown in FIG. 16, the computer system 120 may generate a graph 1600 of the identified anatomical distance of the patient's knee joint through a range of flexion. The graph 1600 includes a curve 1602 showing the measured or determined anatomical distance and a curve 1604 of the adjusted anatomical distance. As illustrated in graph 1600, the amount at which the anatomical distance is adjusted may vary based on the degree of flexion of the patient's knee joint. In some embodiments, the computer system 120 may be configured to display the graph 1600 to the orthopaedic surgeon, who may further modify or adjust the determined anatomical distance indicative of the collateral ligament lengths by a desired amount as discussed above in regard to block 554 by, for example, instructing the computer system 120 to further increase or decrease the determined anatomical distance, which may resultantly adjusts the planned cutting planes of the patient's knee joint.

Referring again back to FIG. 5E, after the computer system 120 has generated and displayed the graph of the anatomical distance(s) in block 556 or if no graph is generated, the method 500 advances to block 558. In block 558, the orthopaedic surgeon may continue with the orthopaedic surgical procedure using the adjusted anatomical distance(s) for surgical planning.

For example, the orthopaedic surgeon and/or computer system 120 may adjust resection planes, select orthopaedic prosthesis, and/or perform other surgical operations based on the adjusted lengths. In some embodiments, for example, the orthopaedic surgeon and/or computer system 120 may determine an initial cutting plane of the femur 200 and/or tibia 700 (e.g., prior to execution of method 500, prior to execution of block 528, or as a sub-component of another block of method 500). The initial cutting plane may then be adjusted based on the estimated bone loss. For example, the initial cutting plane may be moved by an amount equal to the estimated bone loss amount (or equal to the amount at which the anatomical distance is adjusted in block 554). In embodiments in which the bone to be resected is embodied as the femur 200, an initial distal cutting plane may be adjusted superiorly by an amount equal to the estimated bone loss amount (or equal to the amount at which the anatomical distance is adjusted in block 554). It should be appreciated that additional or other cutting planes and associated bone cuts may be adjusted (e.g., femoral posterior cuts, femoral chamfer cuts, femoral anterior cuts, femoral box cuts, tibial proximal cuts, etc.). Additionally, it should be appreciated that the cutting planes may be so adjusted based on the estimated bone loss and/or adjusted anatomical distance such that the updated bone resectioning results in a femoral-tibial distance (i.e., the distance between the identified anatomical features of the femur 200 and tibia 700 or other reference distance between the femur 200 and tibia 700) that matches the corresponding femoral-tibial distance of the patient's "healthy" knee joint when the corresponding orthopaedic prosthesis is implanted into the patient's boney anatomy. For example, the cutting plane may be adjusted or otherwise moved such that the implanted orthopaedic prosthesis results in a positioning of the femur 200 and tibia 700 in respective locations that match the estimated location of the femur 200 and tibia 700 of the patient's "healthy" knee joint (i.e., prior to the damage of the patient's knee joint).

In this way, the computer system 120 may be used by an orthopaedic surgeon to estimate the length of the collateral ligaments of the patient's knee joint prior to the effects of disease or trauma. Additionally, by comparing the determined anatomical distance (which is indicative of the collateral ligament tension) of the patient's knee joint prior to and subsequent to the orthopaedic procedure, the surgeon can assess the effect of the procedure on the compartment of the patient's knee joint. Depending on the particular surgical approach, the surgeon may desire that the measured anatomical distance post-surgery matches the anatomical distance estimated for the patients' healthy knee joint. Alternatively, in other surgical approaches, the anatomical distance post-surgery may not match the estimated anatomical distance of the patient's healthy knee joint. Additionally, it should be appreciated that the desired anatomical distance may be achieved based on amount of resected bone, the thickness of the orthopaedic prostheses, and/or the relative positioning of the orthopaedic prostheses, each of which can be facilitated by the computer system 120.

While the disclosure has been illustrated and described in detail in the drawings and foregoing description, such an illustration and description is to be considered as illustrative and not restrictive in character, it being understood that only illustrative embodiments have been shown and described and that all changes and modifications that come within the spirit of the disclosure are desired to be protected.

There are a plurality of advantages of the present disclosure arising from the various features of the methods, apparatuses, and systems described herein. It will be noted that alternative embodiments of the methods, apparatuses, and systems of the present disclosure may not include all of the features described yet still benefit from at least some of the advantages of such features. Those of ordinary skill in the art may readily devise their own implementations of the methods, apparatuses, and systems that incorporate one or more of the features of the present invention and fall within the spirit and scope of the present disclosure as defined by the appended claims.

The invention claimed is:

1. A method for compensating for bone loss of a patient's knee joint during the performance of an orthopaedic surgical procedure, the method comprising:
    determining, by a computer system, an estimated amount of bone loss of a bone of a patient's knee joint based on a three-dimensional model of the bone, wherein the bone comprises at least one of a femur and a tibia of the patient's knee joint;
    determining, by the computer system, an anatomical distance between a femoral anatomical feature located on the patient's femur and a tibial anatomical feature located on the patient's tibia at a plurality of degrees of flexion of the patient's knee joint while the femur of the patient's knee joint is in contact with the tibia of the patient's knee joint, wherein the anatomical distance is indicative of a ligament length of a collateral ligament of the patient's knee joint; and adjusting, by the computer system, the determined anatomical distance at each degree of flexion based on the estimated amount of bone loss of the bone of the patient's knee joint.

2. The method of claim 1, wherein determining the estimated amount of bone loss of the bone of the patient's knee joint comprises:
applying, by the computer system, a surface curve fitting algorithm to the three-dimensional model of the bone; and
determining, by the computer system, the estimated amount of bone loss based on a difference between a damaged surface of the bone of the patient's knee joint as indicated in the three-dimensional model and a corresponding surface defined by the surface curve fitting algorithm.

3. The method of claim 1, wherein determining the estimated amount of bone loss of the bone of the patient's knee joint comprises:
receiving, by the computer system, a defined bone loss amount provided by a user of the computer system; and
determining, by the computer system, the estimated amount of bone loss based on the defined bone loss amount.

4. The method of claim 3, wherein receiving the defined bone loss amount comprises receiving, by the computer system, a defined bone loss amount for a plurality of locations of a damaged surface of the bone of the patient's knee joint from the user of the computer system, wherein each location of the plurality of locations of the damaged surface contacts the other one of the femur or the tibia of the patient's knee joint at a corresponding degree of flexion of the patient's knee.

5. The method of claim 1, wherein determining the estimated amount of bone loss of the bone of the patient's knee joint comprises:
updating the three-dimensional model of the bone of the patient's knee joint to include indicia of a damaged surface of the bone;
obtaining a three-dimensional statistical shape model of a reference bone corresponding to the bone of the patient's knee joint, wherein the reference bone does not include the damaged surface;
adjusting a set of parameters of the three-dimensional statistical shape model to approximate the bone of the patient's knee joint in a healthy state that does not include the damaged surface; and
comparing the three-dimensional model of the bone of the patient's knee joint including the indicia of the damaged surface to the three-dimensional statistical shape model to determine the estimated amount of bone loss of the bone of the patient's knee joint.

6. The method of claim 1, wherein determining the anatomical distance between the femoral anatomical feature and the tibial anatomical feature comprises determining an anatomical distance between an attachment point of the collateral ligament on the patient's femur and an attachment point of the collateral ligament on the patient's tibia.

7. The method of claim 6, wherein determining the anatomical distance between the attachment point of the collateral ligament on the patient's femur and the attachment point of the collateral ligament on the patient's tibia comprises determining an anatomical distance that is indicative of a length of a medial collateral ligament or a lateral collateral ligament of the patient's knee joint while the patient's knee joint is moved through a range of flexion with the femur of the patient's knee joint in contact with the tibia of the patient's knee joint.

8. The method of claim 1, wherein determining the anatomical distance between the tibial anatomical feature and the femoral anatomical feature comprises determining an anatomical distance between an attachment point of the collateral ligament on the patient's femur and a planned cutting plane of the patient's tibia in each degree of flexion of the plurality of degrees of flexion of the patient's knee.

9. The method of claim 8, wherein adjusting the determined anatomical distance of the collateral ligament comprises increasing the determined anatomical distance between the attachment point of the collateral ligament on the patient's femur and the planned cutting plane of the patient's tibia at each degree of flexion of the plurality of degrees of flexion of the patient's knee.

10. The method of claim 1, wherein adjusting the determined anatomical distance comprises adjusting an estimated length of a medial collateral ligament or a lateral collateral ligament of the patient's knee joint at each degree of flexion based on the estimated amount of bone loss of the bone of the patient's knee joint.

11. The method of claim 1, further comprising:
determining, by the computer system, a cutting plane of the bone of the patient's knee joint based on the adjusted determined anatomical distance; and
performing an orthopaedic bone resection on the bone of the patient's knee joint using the determined cutting plane as a reference for the orthopaedic bone resection.

12. The method of claim 11, wherein adjusting the determined anatomical distance comprises adjusting the determined anatomical distance by an adjustment amount that is based on the estimated amount of bone loss of the bone of the patient's knee joint; and
further comprising determining, by the computer system, an initial cutting plane of the bone of the patient's knee joint,
wherein determining the cutting plane of the bone of the patient's knee joint based on the adjusted determined anatomical distance comprises moving the initial cutting plane by the adjustment amount to define a final cutting plane, and
wherein performing the orthopaedic bone resection comprises performing the orthopaedic bone resection on the bone of the patient's knee joint using the final cutting plane as a reference for the orthopaedic bone resection.

* * * * *